US009942534B2

(12) United States Patent
Watanabe

(10) Patent No.: US 9,942,534 B2
(45) Date of Patent: Apr. 10, 2018

(54) IMAGE PROCESSING SYSTEM AND MICROSCOPE SYSTEM INCLUDING THE SAME

(71) Applicant: OLYMPUS CORPORATION, Tokyo (JP)

(72) Inventor: Nobuyuki Watanabe, Yokohama (JP)

(73) Assignee: OLYMPUS CORPORATION, Tokyo (JP)

( * ) Notice: Subject to any disclaimer, the term of this patent is extended or adjusted under 35 U.S.C. 154(b) by 963 days.

(21) Appl. No.: 13/719,988

(22) Filed: Dec. 19, 2012

(65) Prior Publication Data

US 2013/0155203 A1    Jun. 20, 2013

(30) Foreign Application Priority Data

Dec. 20, 2011 (JP) ................................. 2011-278885
Dec. 27, 2011 (JP) ................................. 2011-286658

(51) Int. Cl.
  *H04N 13/02* (2006.01)
  *G06T 7/571* (2017.01)
  *G02B 21/36* (2006.01)

(52) U.S. Cl.
  CPC ......... *H04N 13/0207* (2013.01); *G06T 7/571* (2017.01); *G02B 21/365* (2013.01);
  (Continued)

(58) Field of Classification Search
  CPC ........ G02B 7/28; G02B 21/365; H04N 5/232; H04N 13/0207; G06T 7/571;
  (Continued)

(56) References Cited

U.S. PATENT DOCUMENTS 5,933,513 A * 8/1999 Yoneyama ................ G06T 5/20
                                                         382/106
6,344,930 B1    2/2002 Kaneko et al.
(Continued)

FOREIGN PATENT DOCUMENTS

JP    H07-312712 A    11/1995
JP    H09-196621 A     7/1997
(Continued)

OTHER PUBLICATIONS

Japanese Office Action dated Aug. 25, 2015 from related Japanese Patent Application No. 2011-278885, together with an English language translation.
(Continued)

*Primary Examiner* — Christopher S Kelley
*Assistant Examiner* — Maria Vazquez Colon
(74) *Attorney, Agent, or Firm* — Scully, Scott, Murphy & Presser, P.C.

(57) ABSTRACT

An image processing system includes an acquisition unit, a candidate value estimation unit, a cutoff frequency acquisition unit and a candidate value modification unit. The acquisition unit is configured to acquire an image of a sample taken via an optical system. The candidate value estimation unit is configured to estimate a candidate value of a 3D shape of the sample based on the image. The cutoff frequency acquisition unit is configured to acquire a cutoff frequency of the optical system based on information of the optical system. The candidate value modification unit is configured to perform at least one of data correction and data interpolation for the candidate value based on the cutoff frequency and calculate a modified candidate value.

24 Claims, 13 Drawing Sheets

(52) U.S. Cl.
CPC ............... *G06T 2207/10016* (2013.01); *G06T 2207/10056* (2013.01); *G06T 2207/10148* (2013.01); *G06T 2207/20052* (2013.01)

(58) Field of Classification Search
CPC . G06T 2207/10016; G06T 2207/10056; G06T 2207/10148; G06T 2207/20052
See application file for complete search history.

(56) References Cited

U.S. PATENT DOCUMENTS

| | | | |
|---|---|---|---|
| 2001/0012394 A1* | 8/2001 | Yoshida | G01N 21/95607 382/149 |
| 2006/0215168 A1* | 9/2006 | Gouch | G06T 5/009 356/456 |
| 2010/0182493 A1 | 7/2010 | Yuba et al. | |
| 2010/0194933 A1 | 8/2010 | Sasaki | |

FOREIGN PATENT DOCUMENTS

| | | |
|---|---|---|
| JP | 9-298682 | 11/1997 |
| JP | H11-052221 A | 2/1999 |
| JP | 2000-316120 A | 11/2000 |
| JP | 2003-287673 A | 10/2003 |
| JP | 2005-156736 A | 6/2005 |
| JP | 2010166247 A * | 7/2010 |
| JP | 2010-178302 A | 8/2010 |
| JP | 2011-164228 A | 8/2011 |

OTHER PUBLICATIONS

Japanese Office Action dated Oct. 6, 2015 from related Japanese Patent Application No. 2011-286658, together with an English language translation.

* cited by examiner

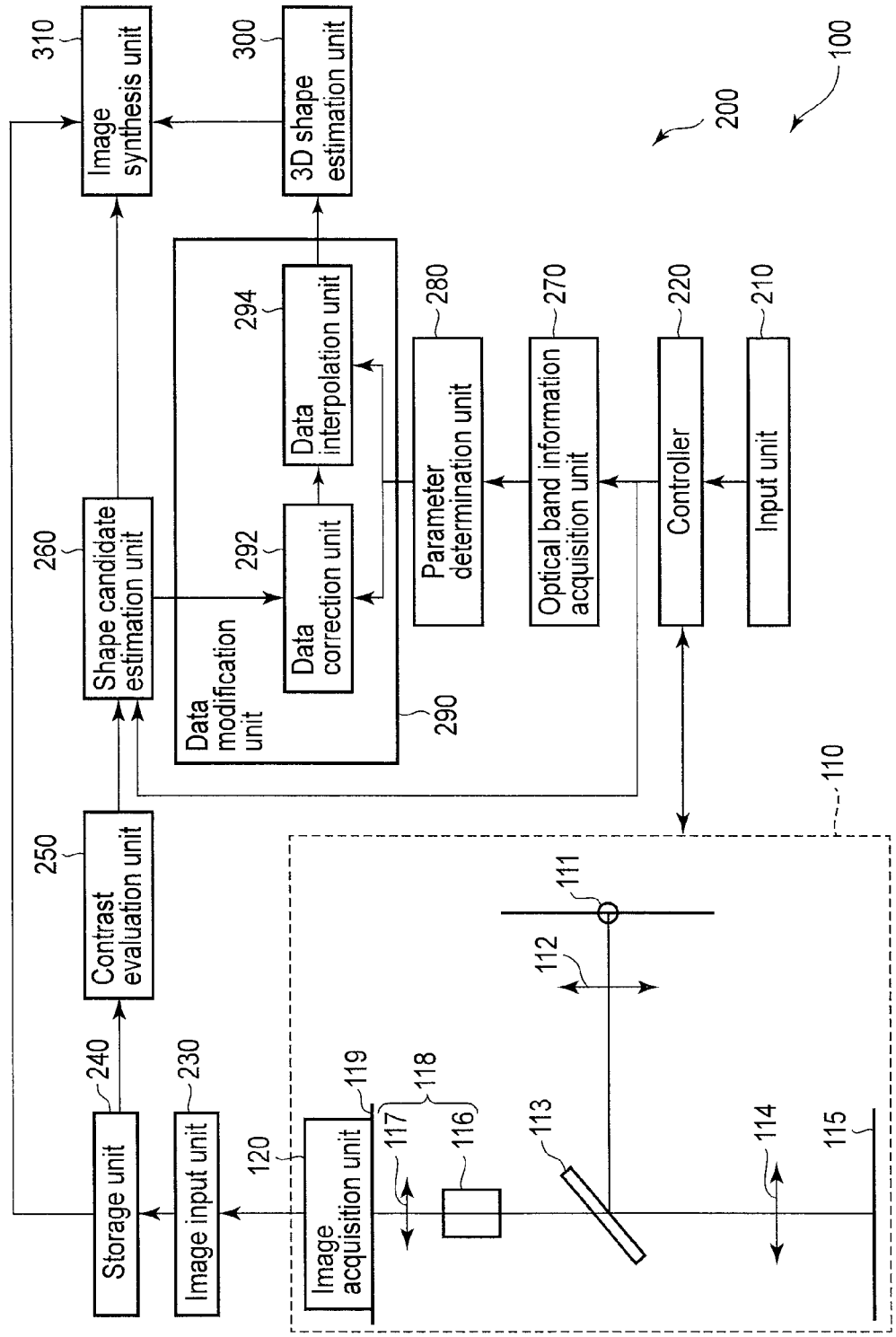
F I G. 1

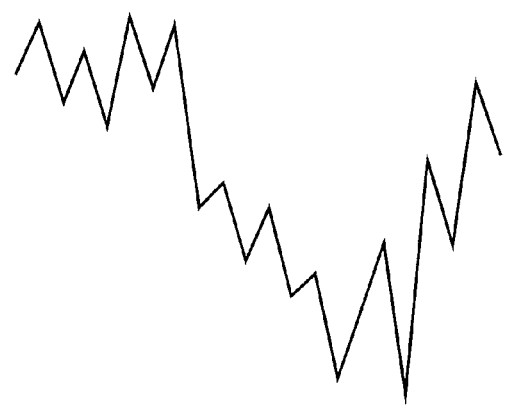
F I G. 4 A
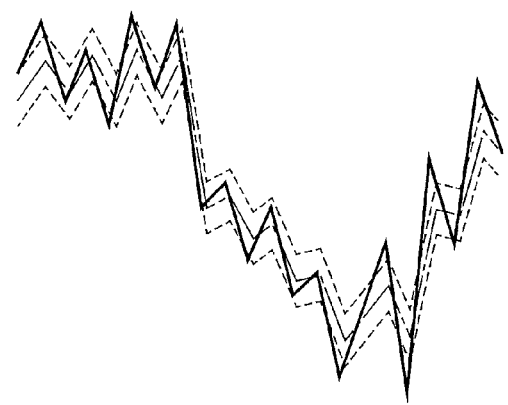
F I G. 4 B
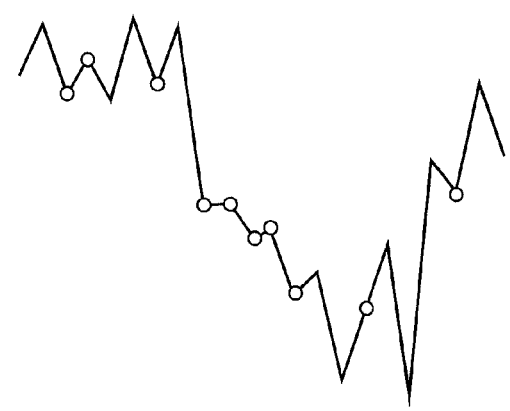
F I G. 4 C

| 224 | 130 | 40 | 16 | 11 | 8 | 2 | -1 |
|---|---|---|---|---|---|---|---|
| 41 | -34 | -14 | -10 | -4 | 0 | -1 | 3 |
| -7 | 10 | -12 | 2 | 2 | -5 | 1 | -1 |
| 22 | -7 | 9 | 2 | 0 | 1 | -3 | 2 |
| -8 | 4 | -6 | 3 | -1 | -2 | 4 | -1 |
| 5 | 2 | -1 | -4 | 0 | 1 | -1 | -1 |
| 4 | -5 | 3 | -1 | 0 | 2 | 0 | -1 |
| -5 | 5 | -2 | 3 | 0 | -2 | 1 | -1 |

FIG. 14

| 28 | 22 | 8 | 2 | 1 | 0 | 0 | 0 |
|---|---|---|---|---|---|---|---|
| 7 | -6 | -2 | -1 | 0 | 0 | 0 | 0 |
| -1 | 1 | -2 | 0 | 0 | 0 | 0 | 0 |
| 3 | -1 | 0 | 0 | 0 | 0 | 0 | 0 |
| -1 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

FIG. 15

IMAGE PROCESSING SYSTEM AND MICROSCOPE SYSTEM INCLUDING THE SAME

CROSS-REFERENCE TO RELATED APPLICATIONS

This application is based upon and claims the benefit of priority from prior Japanese Patent Applications No. 2011-278885, filed Dec. 20, 2011; and No. 2011-286658, filed Dec. 27, 2011, the entire contents of all of which are incorporated herein by reference.

BACKGROUND OF THE INVENTION

1. Field of the Invention

The present invention relates to an image processing system and a microscope system including the same.

2. Description of the Related Art

In general, an image acquired using a microscope at high magnification has a shallow depth of field. There is known a technique of, for example, acquiring a plurality of microscopic images having different focal planes for a particular sample and combining in-focus images of the plurality of microscopic images, thereby creating an all-in-focus image or a 3D reconstructed image. To select the in-focus images, that is, to determine whether an image is in focus, evaluation based on image contrast can be used.

When creating an all-in-focus image or a 3D reconstructed image, a best-in-focus image is selected from a plurality of images having different focal planes for each position in an image, and the 3D shape of the sample is estimated. After that, optimization processing needs to be performed for the estimated value of the 3D shape. This optimization processing can include reducing estimation errors of isolated points based on the correlation between pixels. The optimization processing can also include estimating the sample shape for a position where the above-described selection cannot be done.

Regarding creation of an all-in-focus image, for example, Jpn. Pat. Appln. KOKAI Publication No. 9-298682 discloses a technique of performing processing using a recovery filter after an all-in-focus image has been created. In general, the image enlargement ratio of the optical system of a microscope is higher than that of the optical system of a digital camera. For this reason, the band of the optical system of the microscope is sometimes not so higher than the sampling band of the image sensor of the camera upon micrography. The band of the optical system can change depending on the numerical aperture, magnification, and the like of the optical system. For example, when the microscope has a zoom optical system, the band of the optical system changes as well. In the technique disclosed in Jpn. Pat. Appln. KOKAI Publication No. 9-298682, the coefficient of the recovery filter is determined in accordance with the settings of the optical system, including the magnification and the numerical aperture of the objective lens, in consideration of the change in the band of the optical system.

In general, the image enlargement ratio of the optical system of a microscope is higher than that of the optical system of a digital camera. For this reason, the band of the optical system of the microscope is sometimes not so higher than the sampling band of the image sensor of the camera upon micrography. The band of the optical system can change depending on the numerical aperture, magnification, and the like of the optical system. For example, when the microscope has a zoom optical system, the band of the optical system changes as well.

When evaluating an in-focus state based on the band contrast of an image, the change in the band of the optical system may inhibit accurate in-focus evaluation. An error in the in-focus evaluation based on contrast can occur when contrast based on a factor such as noise not related to the object structure is evaluated because of, for example, application of a high-frequency filter to an image with a low frequency band.

The in-focus evaluation based on contrast is also usable to, for example, acquire height information. The height information acquisition can be used when, for example, object images are captured on a plurality of imaging planes, and an in-focus image at each position is selected from the plurality of images to estimate the height of the object at each position. The height information acquisition can also be used when object images are captured on a plurality of imaging planes, and an in-focus image at each position of the object is selected from the plurality of images, and the selected images are synthesized to create an all-in-focus image.

For example, Jpn. Pat. Appln. KOKAI Publication No. 9-298682 discloses a technique of performing processing using a recovery filter after an all-in-focus image has been created in consideration of a change in the band of the optical system. In this technique, the coefficient of the recovery filter is determined in accordance with the settings of the optical system, including the magnification and the numerical aperture of the objective lens.

BRIEF SUMMARY OF THE INVENTION

According to an aspect of the present invention, an image processing system includes an acquisition unit configured to acquire an image of a sample taken via an optical system; a candidate value estimation unit configured to estimate a candidate value of a 3D shape of the sample based on the image; a cutoff frequency acquisition unit configured to acquire a cutoff frequency of the optical system based on information of the optical system; and a candidate value modification unit configured to perform at least one of data correction and data interpolation for the candidate value based on the cutoff frequency and calculate a modified candidate value.

According to an aspect of the present invention, a microscope system includes the above mentioned image processing system, wherein the optical system includes a variable magnification optical system.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram showing an example of a configuration of a microscope system according to the first and second embodiments;

FIG. 4A is a view showing an example of an original signal corresponding to a shape candidate value so as to explain coring processing;

FIG. 4B is a view showing an example of a moving average and a threshold so as to explain coring processing;

FIG. 4C is a view showing an example of a result of coring processing so as to explain coring processing;

FIG. 14 is a view showing the outline of an example of a table obtained after DCT processing according to the fifth embodiment; and FIG. 15 is a view showing the outline of an example of a table after quantization of the table obtained after DCT processing according to the fifth embodiment.

DETAILED DESCRIPTION OF THE INVENTION

[First Embodiment]

Figure 2:
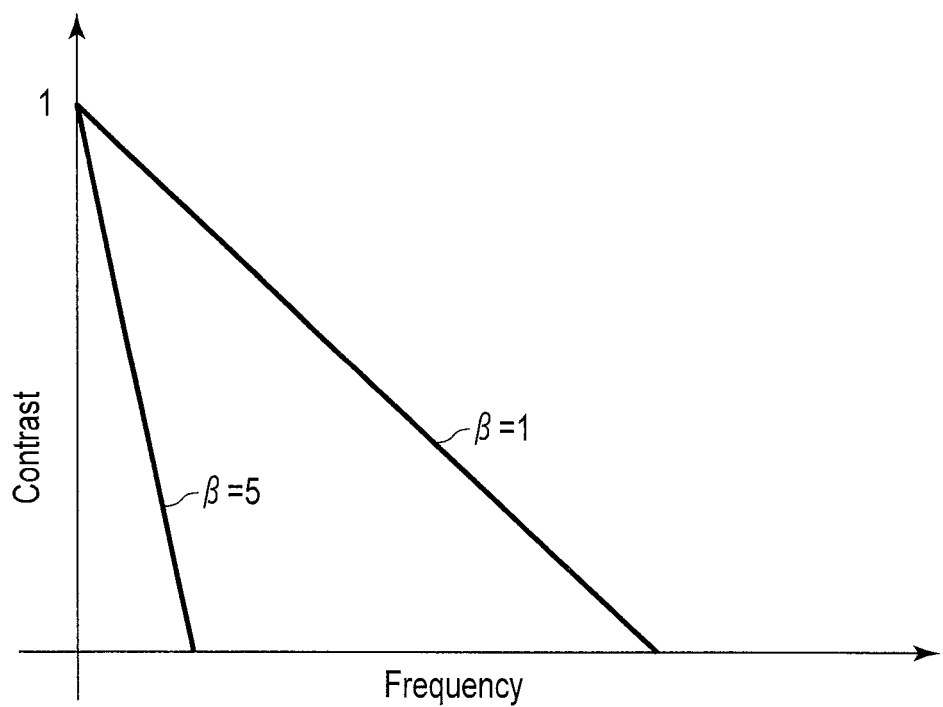
FIG. 2 is a schematic view for explaining the relationship between the frequency and contrast according to an optical system.

The first embodiment of the present invention will be described with reference to the accompanying drawing. FIG. 1 shows the outline of an example of the configuration of a microscope system 100 according to this embodiment. As shown in FIG. 1, the microscope system 100 includes a microscope 110. The microscope 110 is, for example, a digital microscope. The microscope 110 includes an LED light source 111, an illumination optical system 112, an optical path control element 113, an objective lens 114, a sample surface 115 placed on a stage (not shown), an observation optical system 118, an imaging plane 119, and an image acquisition unit 120. The observation optical system 118 includes a zoom optical system 116 and an imaging optical system 117. The objective lens 114, the optical path control element 113, the zoom optical system 116, and the imaging optical system 117 are arranged in this order on the observation optical path from the sample surface 115 to the imaging plane 119.

Illumination light emitted by the LED light source 111 enters the optical path control element 113 via the illumination optical system 112. The optical path control element 113 reflects the illumination light toward the objective lens 114 on the observation optical path. The illumination light irradiates a sample placed on the sample surface 115 via the objective lens 114.

When irradiated with the illumination light, the sample generates observation light. The observation light is reflected light, fluorescence, or the like. The observation light enters the optical path control element 113. Unlike the illumination light, the optical path control element 113 passes the observation light and makes it enter the observation optical system 118 including the zoom optical system 116 and the imaging optical system 117. The optical path control element 113 is an optical element that reflects or passes incident light in accordance with its characteristic. As the optical path control element 113, for example, a polarizer such as a wire grid or a polarizing beam splitter (PBS), which reflects or passes incident light in accordance with its polarization direction is used. Note that as the optical path control element 113, for example, dichroic mirror that reflects or passes incident light in accordance with its frequency may be used.

The observation optical system 118 condenses the observation light on the imaging plane 119, and forms an image of the sample on the imaging plane 119. The image acquisition unit 120 generates an image signal based on the image formed on the imaging plane 119, and outputs the image signal as a microscopic image.

The microscope system 100 includes an input unit 210, a controller 220, an image input unit 230, a storage unit 240, a contrast evaluation unit 250, a shape candidate estimation unit 260, an optical band information acquisition unit 270, a parameter determination unit 280, a data modification unit 290, a 3D shape estimation unit 300, and an image synthesis unit 310. The data modification unit 290 includes an image processing system 200 having a data correction unit 292 and a data interpolation unit 294.

The input unit 210 receives, for example, a user instruction concerning the operation of the microscope system 100. The input unit 210 outputs the received user instruction to the controller 220. The controller 220 controls the operations of the respective units of the microscope 110. In the control of the microscope 110, the controller 220 uses the user instruction input from the input unit 210. In this embodiment, the microscope system 100 acquires a plurality of microscopic images of a single sample captured on different focal planes. Hence, the controller 220 causes the image acquisition unit 120 to acquire the image of the sample on each focal plane while controlling the optical system of the microscope 110 to gradually change the focal plane. More specifically, for example, the controller 220 causes the image acquisition unit 120 to acquire each image while changing the height of the stage, the height of the objective lens, or the position of the focus lens of the microscope 110.

In response to a request from the optical band information acquisition unit 270, the controller 220 outputs the parameters of various kinds of optical systems of the microscope 110 to the optical band information acquisition unit 270. The parameters of the optical systems include, for example, the parameters of the objective optical system, the illumination optical system, the zoom optical system, and the imaging optical system. Note that the controller 220 controls the optical systems of the microscope 110 and therefore has the information of the parameters of the optical systems.

The image input unit 230 acquires a microscopic image from the image acquisition unit 120. The image input unit 230 outputs the microscopic image to the storage unit 240. The storage unit 240 temporarily stores the input microscopic image. In this embodiment, the image acquisition unit 120 acquires a plurality of microscopic images having different focal planes for a single sample under the control of the controller 220. Hence, the image input unit 230 acquires the plurality of microscopic images having different focal planes, and the storage unit 240 stores the plurality of microscopic images. In response to a request from the contrast evaluation unit 250, the storage unit 240 outputs the stored microscopic images to the contrast evaluation unit 250. Additionally, in response to a request from the image synthesis unit 310, the storage unit 240 outputs the stored microscopic images to the image synthesis unit 310.

The contrast evaluation unit 250 acquires the plurality of microscopic images having different focal planes from the storage unit 240. The contrast evaluation unit 250 evaluates the intensity of high frequency components for each pixel of the plurality of microscopic images, and calculates a contrast evaluation value. The contrast evaluation unit 250 outputs the calculated contrast evaluation value of each pixel of the microscopic images to the shape candidate estimation unit 260.

The shape candidate estimation unit 260 evaluates the in-focus state of each pixel of each of the plurality of microscopic images based on the contrast evaluation value input from the contrast evaluation unit 250. The shape candidate estimation unit 260 selects the best-in-focus image out of the plurality of images having different focal planes for each pixel of the image. The shape candidate estimation unit 260 acquires, from the controller 220, the information of the focal plane when the best-in-focus image has been captured, estimates the height of the sample corresponding to each pixel of the image based on the information, and calculates a shape candidate value that is information about the shape of the sample. For a pixel for which the height of the sample could not be estimated based on the contrast evaluation value, the shape candidate estimation unit 260 sets a value representing inestimability as the shape candidate value corresponding to the pixel. The shape candidate estimation unit 260 outputs each calculated shape candidate value to the data correction unit 292 in the data modification unit 290.

The optical band information acquisition unit 270 acquires the parameter of various kinds of optical systems from the controller 220. The optical band information acquisition unit 270 outputs the acquired parameters of the optical system to the parameter determination unit 280. The parameter determination unit 280 calculates correction parameters to be described later based on the parameters of the optical system input from the optical band information acquisition unit 270. The parameter determination unit 280 outputs the calculated correction parameters to the data correction unit 292 in the data modification unit 290. The parameter determination unit 280 also calculates interpolation parameters to be described later based on the parameters of the optical system. The parameter determination unit 280 outputs the calculated interpolation parameters to the data interpolation unit 294 in the data modification unit 290.

The data correction unit 292 provided in the data modification unit 290 performs coring processing for the shape candidate values input from the shape candidate estimation unit 260 to remove noise of the shape candidate values. When performing the coring processing, the data correction unit 292 uses the correction parameters input from the parameter determination unit 280, as will be described later in detail. The data correction unit 292 outputs, to the data interpolation unit 294, noise-removed shape candidate values that are shape candidate values having undergone noise removal.

The data interpolation unit 294 provided in the data modification unit 290 interpolates data for each pixel having a value representing inestimability out of the noise-removed shape candidate values input from the data correction unit 292. When interpolating data, the data interpolation unit 294 uses the interpolation parameters input from the parameter determination unit 280, as will be described later in detail. The data interpolation unit 294 outputs, to the 3D shape estimation unit 300, interpolated shape candidate values that are shape candidate values having undergone noise removal and interpolation of the values of the inestimable pixels.

The 3D shape estimation unit 300 optimizes height information based on the interpolated shape candidate values input from the data interpolation unit 294, and determines the estimated value of the 3D shape of the sample. The 3D shape estimation unit 300 outputs the determined 3D shape of the sample to the image synthesis unit 310. The image synthesis unit 310 synthesizes the plurality of microscopic images having different focal planes based on the 3D shape of the sample input from the 3D shape estimation unit 300 and the plurality of microscopic images acquired from the storage unit 240, thereby creating a synthesized image. This synthesized image is, for example, a 3D reconstructed image or an all-in-focus image. The image synthesis unit 310 outputs the created synthesized image to, for example, a display unit to display it, or outputs the synthesized image to, for example, a storage device to store it.

The operation of the microscope system 100 according to this embodiment will be described. The sample is placed on the sample surface 115. The controller 220 controls the microscope 110. The controller 220 gradually changes the focal plane of the optical system for the sample by, for example, gradually changing the position of the sample surface 115 in the optical axis direction. More specifically, for example, the controller 220 changes the height of the stage, the height of the objective lens, or the position of the focus lens of the microscope 110. At this time, the controller 220 causes the image acquisition unit 120 to sequentially acquire the microscopic image of the sample on each focal plane. The image input unit 230 acquires the microscopic image of the sample on each focal plane from the image acquisition unit 120. The image input unit 230 outputs the acquired microscopic images to the storage unit 240. The storage unit 240 stores the plurality of microscopic images input from the image input unit 230.

The contrast evaluation unit 250 acquires the plurality of microscopic images having different focal planes from the storage unit 240. The contrast evaluation unit 250 evaluates the intensity of high frequency components for each pixel of the plurality of microscopic images, and calculates a contrast evaluation value. The contrast evaluation unit 250 outputs the calculated contrast evaluation value of each pixel of the microscopic images to the shape candidate estimation unit 260.

The shape candidate estimation unit 260 evaluates the in-focus state of each pixel of each of the plurality of microscopic images based on the contrast evaluation value input from the contrast evaluation unit 250. For example, the higher the contrast is, the higher the shape candidate estimation unit 260 evaluates the in-focus level. In addition, the shape candidate estimation unit 260 selects the best-in-focus image out of the plurality of images having different focal planes for each pixel of the image. The shape candidate estimation unit 260 acquires, from the controller 220, the information of the focal plane when the best-in-focus image has been captured. The shape candidate estimation unit 260 estimates the height of the sample corresponding to each pixel of the image based on the information acquired from the controller 220, and calculates a shape candidate value P(i, j) that is information about the shape of the sample. In this case, (i, j) represent coordinates. The shape candidate value P(i, j) represents, for example, the height of the sample at the coordinates (i, j). If the height of the sample could not be estimated based on the contrast evaluation value, the shape candidate estimation unit 260 sets a value representing inestimability as the shape candidate value P(i, j) corresponding to the pixel. The shape candidate estimation unit 260 outputs the calculated shape candidate value P(i, j) to the data correction unit 292.

In response to a request from the optical band information acquisition unit 270, the controller 220 outputs information about various kinds of optical systems of the microscope 110 at the time of microscopic image acquisition to the optical band information acquisition unit 270. The optical band information acquisition unit 270 acquires a numerical aperture $NA_{obj}$ of the objective lens 114, an image magnification β that is the total magnification of the observation optical system 118, and a wavelength λ of illumination light emitted by the LED light source 111, which are the parameters of the optical system. The optical band information acquisition unit 270 outputs these parameters to the parameter determination unit 280.

The parameter determination unit 280 calculates a cutoff frequency Fc using the acquired optical system parameters based on, for example, $$Fc = \frac{2 \cdot NA_{obj}}{\beta \cdot \lambda}, \quad (1)$$

where $NA_{obj}$ is the numerical aperture, β is the magnification, and λ is the wavelength. Note that strictly speaking, not only the numerical aperture of the objective lens but also that of the condenser lens on the illumination side is also related to the numerical aperture $NA_{obj}$. However, here is assumed a case in which the illumination is incoherent, the sample is a scatterer, and the numerical aperture on the illumination side need not be taken into consideration.

Note that many high frequency components are included when the image magnification β is low, that is, at a low magnification, and the number of high frequency components decreases when the image magnification β is high, that is, at a high magnification. Equation (1) also indicates this well. Note that the wavelength λ need not always be the wavelength of the illumination light and may be a predetermined value such as 550 nm.

FIG. 2 shows the outline of the relationship between the frequency and contrast according to the image magnification β when the modulation transfer function (MTF) of the lens is not taken into consideration. FIG. 2 shows a case in which β is 1 and a case in which β is 5. The contrast C is given by $$C = \frac{Lf - Df}{L0 - D0}, \quad (2)$$

where L0 is the bright luminance level at a frequency of zero in the contrast chart, D0 is the dark luminance level at the frequency of zero, Lf is the luminance level of a bright region at a frequency f, and Df is the luminance level of a dark region at the frequency f. Note that the frequency at which the contrast is zero is defined as the cutoff frequency Fc.

The parameter determination unit 280 determines correction parameters m, n, and w(k, l) to be used by the data correction unit 292 based on the cutoff frequency Fc. The parameter determination unit 280 stores, for example, a lookup table representing the relationship between the cutoff frequency Fc and correction parameters m, n, and w(k, l). The parameter determination unit 280 determines correction parameters m; n, and w(k, l) based on the cutoff frequency Fc by looking up the lookup table. The lower the cutoff frequency Fc is, the larger the values of correction parameters m and n are. As correction parameter w(k, 1), a function that does not decrease the weight when the values m and n are large is given in equation (5), to be described later. The parameter determination unit 280 outputs the determined correction parameters m, n, and w(k, l) to the data correction unit 292.

The dimension of the distance and the dimension of the frequency (for example, the number of cycles per unit distance) hold a reciprocal relationship. Hence, the parameter determination unit 280 may obtain correction parameters m and n by $$m = \text{int}\left(\frac{C_1}{Fc}\right) \quad (3)$$

$$n = \text{int}\left(\frac{C_2}{Fc}\right),$$

where int is integerization processing, and $C_1$ and $C_2$ are arbitrary coefficients. Alternatively, a function generally having a negative correlation may be used.

The parameter determination unit 280 also determines interpolation parameters $\sigma_k$ and $\sigma_l$ to be used by the data interpolation unit 294. The parameter determination unit 280 stores, for example, a lookup table representing the relationship between the cutoff frequency Fc and the interpolation parameters $\sigma_k$ and $\sigma_l$. The parameter determination unit 280 determines the interpolation parameters $\sigma_k$ and $\sigma_l$ based on the cutoff frequency Fc by looking up the lookup table.

The lower the cutoff frequency Fc is, the larger the values of the interpolation parameters $\sigma_k$ and $\sigma_l$ are. The parameter determination unit 280 outputs the determined interpolation parameters $\sigma_k$ and $\sigma_l$ to the data interpolation unit 294.

As will be described later, the interpolation parameters $\sigma_k$ and $\sigma_l$ represent the variance of a Gaussian distribution. The variance has the dimension of the distance. Hence, like correction parameters m and n, the parameter determination unit 280 may obtain the interpolation parameters $\sigma_k$ and $\sigma_l$ by $$\sigma_k = \text{int}\left(\frac{C_3}{Fc}\right) \quad (4)$$

$$\sigma_l = \text{int}\left(\frac{C_4}{Fc}\right),$$

where int is integerization processing, and $C_3$ and $C_4$ are arbitrary coefficients.

Figure 3:
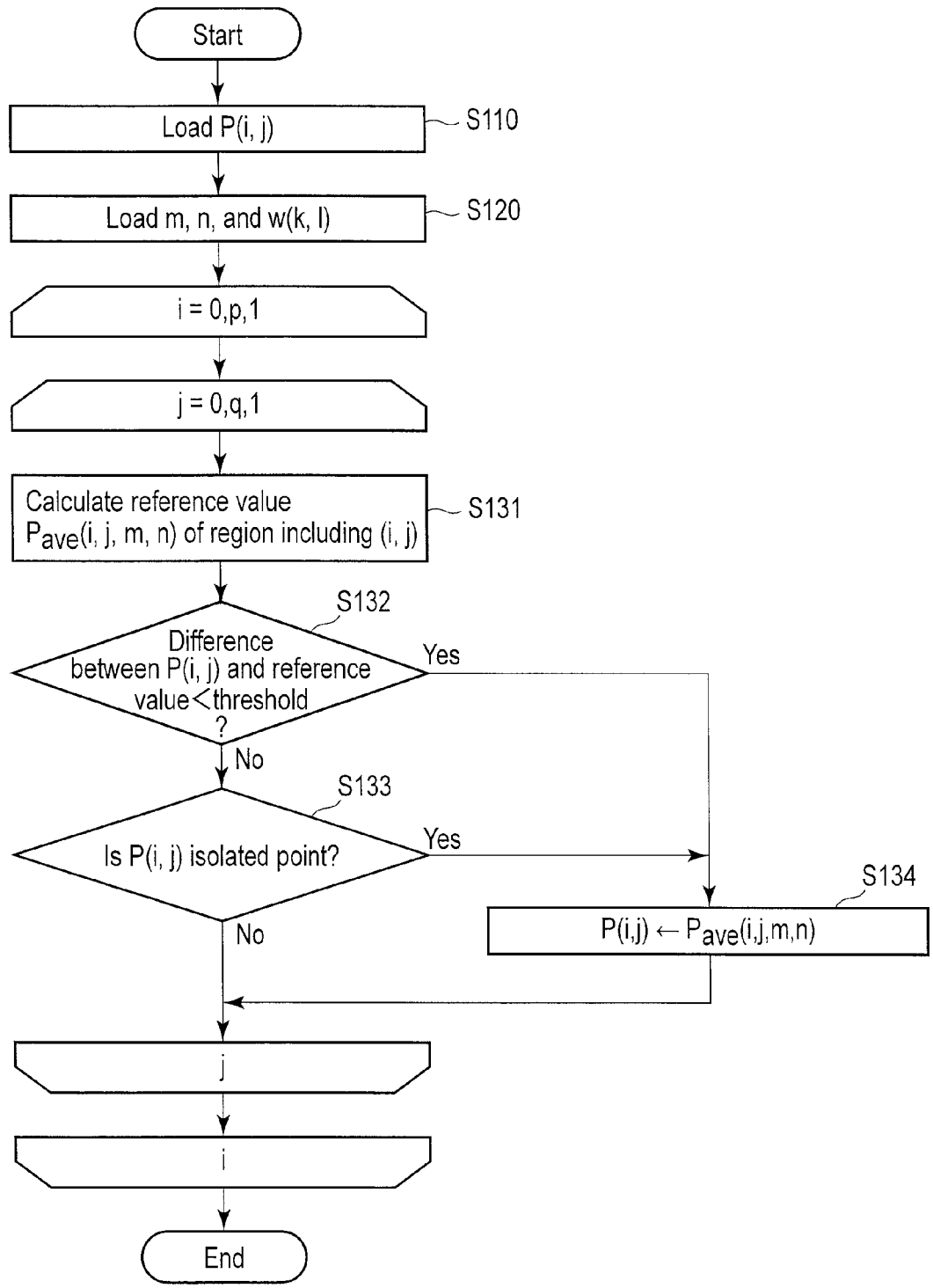
FIG. 3 is a flowchart showing an example of processing of a data correction unit according to the first embodiment.

The data correction unit 292 performs noise/isolated point removal processing of removing noise and isolated points from the shape candidate value P(i, j). In this embodiment, the noise/isolated point removal processing is performed by coring processing. FIG. 3 is a flowchart showing the noise/isolated point removal processing.

In step S110, the data correction unit 292 loads the shape candidate value P(i, j). In this embodiment, the microscopic image is assumed to have a size of (p+1) pixels from 0 to p in the horizontal direction and a size of (q+1) pixels from 0 to q in the vertical direction. In step S120, the data correction unit 292 loads correction parameters m, n, and w(k, l).

In this embodiment, as shown in FIG. 3, the following processing is sequentially performed for the shape candidate values P(i, j) corresponding to all pixels of an image in steps S131 to S134. In step S131, the data correction unit 292 calculates a reference value $P_{ave}(i, j, m, n)$ of a region including (i, j) based on $$P_{ave}(i, j, m, n) = \frac{1}{(2m+1)(2n+1)} \sum_{k=-m}^{m} \sum_{l=-n}^{n} w(k, l) P(i+k, i+l). \quad (5)$$

As shown in equation (5), the reference value $P_{ave}(i, j, m, n)$ indicates the average value in this region. In equation (5), correction parameters m, n, and w(k, l) determined by the parameter determination unit 280 are used. That is, equation (5) changes in accordance with the cutoff frequency Fc.

In step S132, the data correction unit 292 determines whether the difference between the shape candidate value P(i, j) and the reference value $P_{ave}(i, j, m, n)$ is smaller than a predetermined threshold. If the difference between the shape candidate value P(i, j) and the reference value $P_{ave}(i, j, m, n)$ is smaller than a predetermined threshold $Th_{r-1}$, that is, upon determining that $(|P(i, j) - P_{ave}(i, j, m, n)| < Th_{r-1})$, the process goes to step S134.

Note that the threshold $Th_{r-1}$ is defined based on an empirical rule such as a criterion to determine whether the difference falls within the error range of the reference value or not.

On the other hand, if the difference between the shape candidate value P(i, j) and the reference value $P_{ave}(i, j, m, n)$ is not smaller than the predetermined threshold, the data correction unit 292 determines, in step S133, whether the shape candidate value P(i, j) is an isolated point. If the shape candidate value P(i, j) is an isolated point, the process goes to step S134.

As a detailed method, the isolated point is determined by $(|P(i, j) - P_{ave}(i, j, m, n)| > Th_{r-2})$. $Th_{r-2}$ is set from the variance in a predetermined region of a plurality of pixels. More specifically, for example, when the variance is σ, $Th_{r-2}$ is set as ±2σ to determine the isolated point.

In step S134, the data correction unit 292 sets the value of the shape candidate value P(i, j) to the reference value $P_{ave}(i, j, m, n)$. The processes in steps S131 to S134 are performed for all pixels. That is, letting ΔT be the predetermined threshold, this processing is represented by a noise-removed shape candidate value P'(i, j) that is the shape candidate value after the processing and given by $$P'(i, j) = \begin{cases} P(i, j) : \|P(i, j) - P_{ave}(i, j, m, n)\| \geq \Delta T \\ P_{ave}(i, j, m, n) : \|P(i, j) - P_{ave}(i, j, m, n)\| < \Delta T. \end{cases} \quad (6)$$

The concept of coring processing used in this embodiment will be explained with reference to FIGS. 4A, 4B, and 4C. FIG. 4A shows an original signal corresponding to the shape candidate value P(i, j). A moving average corresponding to the average value calculated by equation (5) for the original signal is indicated by the dashed-dotted line in FIG. 4B. A value obtained by adding or subtracting a threshold corresponding to the predetermined threshold ΔT to or from the moving average is indicated by a broken line in FIG. 4B. In this case, as represented by equation (6), when the original signal is located between the two broken lines in FIG. 4B, the original signal is replaced with the moving average indicated by the dashed-dotted line. As a consequence, a result as shown in FIG. 4C is obtained. Note that in FIG. 4C, a circle indicates a value replaced with the moving average. As described above, the coring processing has the effect of suppressing a variation component determined as a small amplitude signal and deleting an error.

The data correction unit 292 outputs the value obtained by performing the noise/isolated point removal processing described with reference to FIG. 3 for the shape candidate value P(i, j), that is, the noise-removed shape candidate value P'(i, j) to the data interpolation unit 294.

The data interpolation unit 294 interpolates data whose noise-removed shape candidate value P'(i, j) input from the data correction unit 292 represents inestimability. Inestimability means that the shape candidate estimation unit 260 could not specify the in-focus state of an image when calculating the shape candidate value P(i, j) based on the contrast evaluation value calculated by the contrast evaluation unit 250. That is, inestimability indicates that the contrast evaluation value of any of a plurality of microscopic images for a pixel of interest does not meet a condition representing a predetermined in-focus state.

If values around the noise-removed shape candidate value P'(i, j) representing inestimability are not inestimable, that is, if only one pixel out of a region of, for example, 5 pixels×5 pixels is inestimable, the data interpolation unit 294 interpolates the inestimable data using neighboring data. At this time, the data interpolation unit 294 can use, for example, bilinear interpolation or bicubic interpolation for the data interpolation.

Figure 5:
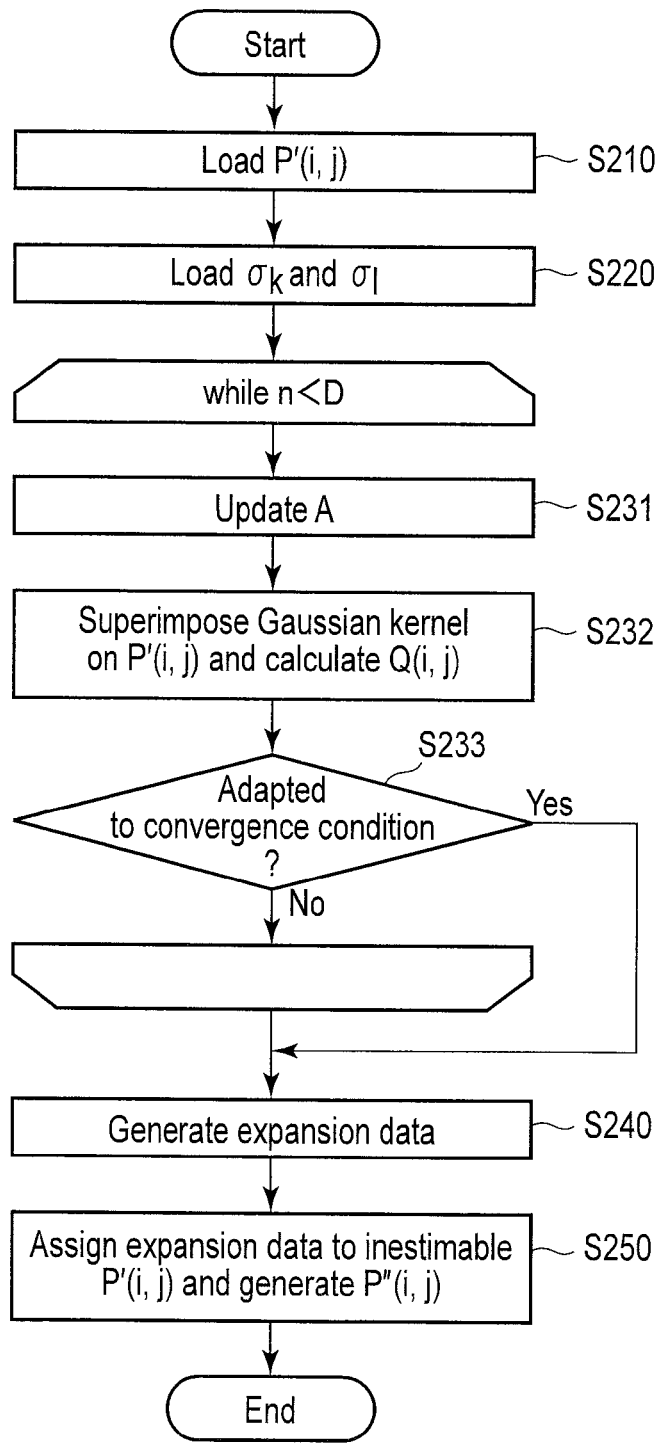
FIG. 5 is a flowchart showing an example of processing of a data interpolation unit according to the first embodiment.

On the other hand, if noise-removed shape candidate values P'(i, j) representing inestimability continuously exist, the data interpolation unit 294 interpolates the inestimable data based on a function representing the correlation to neighboring data. That is, the distribution around the inestimable portion is assumed, thereby estimating the value of the portion. In this embodiment, kernel regression method is used in interpolation. At this time, the data interpolation unit 294 uses the interpolation parameters $\sigma_k$ and $\sigma_l$ input from the parameter determination unit 280. An example of the interpolation processing will be described with reference to the flowchart of FIG. 5.

In step S210, the data interpolation unit 294 loads the noise-removed shape candidate value P'(i, j). In step S220, the data interpolation unit 294 loads the interpolation parameters $\sigma_k$ and $\sigma_l$. Next, the data interpolation unit 294 calculates interpolation data Q(i, j). The interpolation data Q(i, j) is given by $$Q(i, j) = \frac{1}{N} \sum_{P'(i+k, j+l) \neq 0} P'(i+k, j+l) C(k, l), \quad (7)$$

where N is the number of sampling points which is given by $$N=(2k+1)\cdot(2l+1). \tag{8}$$

In addition, C(k, j) is given by $$C(k, l) = A\exp\left(-\frac{1}{2}\left(\frac{k}{\sigma_k}\right)^2\right)\exp\left(-\frac{1}{2}\left(\frac{l}{\sigma_l}\right)^2\right). \tag{9}$$

As indicated by equation (9), C(k, l) is determined in accordance with the interpolation parameters $\sigma_k$ and $\sigma_l$. A is a predetermined coefficient.

In step S231, the data interpolation unit 294 updates the variable A. In step S232, the data interpolation unit 294 superimposes a Gaussian kernel on the noise-removed shape candidate value P'(i, j) based on equations (7) to (9). In step S233, the data interpolation unit 294 determines whether the value obtained in step S232 meets a predetermined convergence condition. If the value meets the convergence condition, the process goes to step S240. On the other hand, if the value does not meet the convergence condition, the processes in steps S231 to S233 are repeated up to a predetermined count D. That is, the interpolation data Q(i, j) for each variable A is calculated in step S232, and it is determined in step S233 whether the calculated interpolation data Q(i, j) meets the convergence condition until the convergence condition is met while changing the value of the variable A in step S231.

Upon determining in step S233 that the interpolation data Q(i, j) meets the convergence condition, in step S240, the data interpolation unit 294 generates expansion data based on the interpolation data Q(i, j) that meets the convergence condition. In step S250, the data interpolation unit 294 assigns the generated expansion data to the inestimable data of the noise-removed shape candidate values P'(i, j), thereby generating an interpolated shape candidate value P"(i, j). The data interpolation unit 294 outputs the generated interpolated shape candidate value P"(i, j) to the 3D shape estimation unit 300.

The 3D shape estimation unit 300 optimizes height information based on the interpolated shape candidate value P"(i, j) input from the data interpolation unit 294, and estimates the 3D shape of the sample. The 3D shape estimation unit 300 outputs the estimated 3D shape of the sample to the image synthesis unit 310.

The image synthesis unit 310 synthesizes a synthesized image based on the 3D shape of the sample input from the 3D shape estimation unit 300 and the plurality of microscopic images having different focal planes acquired from the storage unit 240. If the synthesized image is, for example, a 3D reconstructed image, the synthesized image is created by synthesizing the 3D shape with the in-focus images concerning the respective portions of the 3D shape. If the synthesized image is, for example, an all-in-focus image, images extracted from microscopic images having focal planes corresponding to the heights of the respective pixels are combined, thereby synthesizing an image that is in focus for all pixels. The image synthesis unit 310 outputs the created synthesized image to a display unit or a storage device. Since a normal microscopic image has a shallow depth of field, it is difficult for the user to recognize, by the normal microscopic image, the image of a sample whose height is greater than the depth of field. However, by a 3D reconstructed image or an all-in-focus image, the user can easily recognize the image of a sample whose height is greater than the depth of field.

As described above, for example, the image input unit 230 functions as an acquisition unit configured to acquire a plurality of images having focal positions different from each other for a single sample taken via an optical system. For example, the contrast evaluation unit 250 functions as a contrast evaluation unit configured to perform contrast evaluation for each pixel in each of the plurality of the images and calculate the contrast evaluation value of each pixel. For example, the shape candidate estimation unit 260 functions as a candidate value estimation unit configured to select an in-focus pixel out of the respective pixels and estimate the candidate value of the 3D shape of the sample based on the images. For example, the optical band information acquisition unit 270 functions as a cutoff frequency acquisition unit configured to acquire the cutoff frequency of the optical system based on the information of the optical system. For example, the data modification unit 290 functions as a candidate value modification unit configured to perform at least one of data correction and data interpolation for the candidate value based on the cutoff frequency and calculate a modified candidate value. For example, the data correction unit 292 functions as a modified candidate value calculation unit configured to calculate a modified candidate value using correlation of a local region represented by the candidate value. For example, the image synthesis unit 310 functions as an all-in-focus image creation unit configured to create an all-in-focus image based on the modified candidate value and the plurality of images. For example, the image synthesis unit 310 functions as a 3D reconstructed image creation unit configured to create a 3D reconstructed image based on the modified candidate value and the plurality of images. For example, the 3D shape estimation unit 300 functions as a 3D shape estimation unit configured to optimize the modified candidate value and estimate the 3D shape of the sample.

According to this embodiment, as the result of processing of the data correction unit 292, errors caused by noise and estimation processing are effectively reduced in the microscope system 100. At this time, correction parameters m and n are determined based on the cutoff frequency Fc of the optical system of the microscope 110. The lower the cutoff frequency Fc is, the larger the values of correction parameters m and n are. For this reason, in equation (5), as the cutoff frequency Fc decreases, the reference value $P_{ave}$(i, j, m, n) is calculated based on the shape candidate values P(i, j) in a wider region. As the cutoff frequency Fc increases, the reference value $P_{ave}$(i, j, m, n) is calculated based on the shape candidate values P(i, j) in a narrower region. That is, the optimum reference value $P_{ave}$(i, j, m, n) is calculated in accordance with the cutoff frequency Fc of the optical system of the microscope 110. As a result, noise can accurately be reduced as compared to a case in which the cutoff frequency Fc of the optical system is not taken into consideration. That is, the shape Candidate values P(i, j) are not excessively smoothed. Even if many noise components exist, the input signal is not excessively evaluated as a high frequency signal.

In the processing of the data interpolation unit 294, information of the original frequency band of the image signal is used when assuming the correlation of neighboring data. That is, an optimized Gaussian kernel corresponding to the frequency band can be generated, and the value of the height of the sample at a position, which is inestimable based on the contrast evaluation value, can be estimated. At this time, the interpolation parameters $\sigma_k$ and $\sigma_l$ are given based on the cutoff frequency Fc of the optical system. It is therefore possible to increase the processing speed due to the small calculation amount and prevent the calculation result from converging to an incorrect value by comparison with a case in which the convergence value is searched for while changing the values of the interpolation parameters. The lower the cutoff frequency Fc is, the larger the values of the interpolation parameters $\sigma_k$ and $\sigma_l$ are. For this reason, in equation (7), as the cutoff frequency Fc decreases, the interpolation data Q(i, j) is calculated based on the noise-removed shape candidate values P'(i, j) in a wider region. As the cutoff frequency Fc increases, the interpolation data Q(i, j) is calculated based on the noise-removed shape candidate values P'(i, j) in a narrower region. That is, the noise-removed shape candidate values P'(i, j) are not excessively smoothed. Edge structure evaluation is appropriately done. Even if many noise components exist, the input signal is not excessively evaluated as a high frequency signal.

Note that when a zoom optical system is included in the optical systems of the microscope 110, the numerical aperture and the band of a microscopic image change in accordance with the focal length of the zoom optical system. Hence, this embodiment is particularly effective. Note that the above-described equations are merely examples. Not these equations but any other equations may be used as a matter of course as far as the above-described effects can be obtained. In the above-described embodiment, the processing is performed for each pixel. However, the processing may be performed for each region including a plurality of pixels.

[Modification of First Embodiment]

A modification of the first embodiment will be described. Points of difference from the first embodiment will be explained here. The same reference numbers denote the same parts, and a description thereof will be omitted. In the processing of the data interpolation unit 294 according to the first embodiment, the interpolation parameters $\sigma_k$ and $\sigma_l$ are set to $\sigma_k$ and $\sigma_l$ in equation (9), and these values remain unchanged in the loop processing of steps S231 to S233 described with reference to FIG. 5.

In this modification, however, the convergence value is searched for while changing $\sigma_k$ and $\sigma_l$ as well in step S231. Hence, in this modification, the parameter determination unit 280 outputs a range or probability density function capable of setting the interpolation parameters $\sigma_k$ and $\sigma_l$ to the data interpolation unit 294. In the loop processing of steps S231 to S233, the data interpolation unit 294 searches for the convergence value while changing $\sigma_k$ and $\sigma_l$ as well based on the range or probability density function capable of setting the interpolation parameters $\sigma_k$ and $\sigma_l$ and input from the parameter determination unit 280. The rest of the operation is the same as in the first embodiment.

According to this modification, although the amount of processing is greater than in the first embodiment, the interpolation data Q(i, j) can converge to a convergence value more suitable than in the first embodiment. In the modification as well, the parameter determination unit 280 determines the range or probability density function capable of setting the interpolation parameters $\sigma_k$ and $\sigma_l$ based on the cutoff frequency Fc of the optical system. Hence, the same effects as in the first embodiment can be obtained.

[Second Embodiment]

The second embodiment of the present invention will be described. Points of difference from the first embodiment will be explained here. The same reference numbers denote the same parts, and a description thereof will be omitted. In this embodiment, a data correction unit 292 uses a bilateral filter to remove noise. The bilateral filter used in this embodiment is expressed as $$P'(i, j) = \frac{\sum_{k=-m}^{m}\sum_{l=-n}^{n} P(i+k, j+l)C(k, l)S(P(i, j) - P(i+k, i+l))}{\sum_{k=-m}^{m}\sum_{l=-n}^{n} C(k, l)S(P(i, j) - P(i+k, i+l))}, \quad (10)$$

where C(k, l) is a factor that specifies the distance correlation, and $S(P_1-P_2)$ is a factor that specifies correlation resulting from the pixel level difference between different pixels. The sharpness and the signal-to-noise ratio of a generated image change depending on what kind of distribution function is used for C(k, l) and $S(P_1-P_2)$.

In this embodiment, for example, C(k, l) and $S(P_1-P_2)$ are functions based on a Gaussian distribution. That is, C(k, l) is given by, for example, $$C(k, l) = A\exp\left(-\frac{1}{2}\left(\frac{k}{\sigma_k}\right)^2\right)\exp\left(-\frac{1}{2}\left(\frac{l}{\sigma_l}\right)^2\right), \quad (11)$$

where $\sigma_k$ and $\sigma_l$ are correction parameters, and A is a predetermined constant. Correction parameters $\sigma_k$ and $\sigma_l$ are the same as the interpolation parameters $\sigma_k$ and $\sigma_l$ of the first embodiment. In addition, $S(P_1-P_2)$ is given by $$S(P_1 - P_2) = B\exp\left(-\frac{1}{2}\left(\frac{\|P_1 - P_2\|}{\sigma_P}\right)^2\right), \quad (12)$$

where $\sigma_P$ is a correction parameter, and B is a predetermined constant. In this embodiment, a parameter determination unit 280 determines even correction parameter $\sigma_P$ based on a cutoff frequency Fc of the optical system by looking up a lookup table. The lower the cutoff frequency Fc is, the larger the value of correction parameter $\sigma_P$ is.

As in the first embodiment, when the information of the cutoff frequency Fc of the optical system is acquired, the original sharpness of a microscopic image can be estimated. For example, when the cutoff frequency Fc is low, C(k, l) is set so as to emphasize long-distance correlation, and $S(P_1-P_2)$ is set based on the assumption that no abrupt step is generated with respect to neighboring data. As described above, for example, $S(P_1-P_2)$ functions as first correlation that is correlation between the values of two points spaced apart. For example, C(k, l) functions as second correlation that is correlation by the distance.

In this embodiment, information of the original frequency band of a microscopic image is used when assuming the correlation of neighboring data. The bilateral filter is set based on the correlation of neighboring data. According to this embodiment, it is consequently possible to acquire a noise-removed shape candidate value P'(i, j) by effectively reducing noise and errors of a shape candidate value P(i, j).

Note that in this embodiment as well, correction parameters $\sigma_k$, $\sigma_l$, and $\sigma_P$ may be set as a probability density function, as in the modification of the first embodiment. In this case as well, the same effects as in this embodiment can be obtained.

[Modification of Second Embodiment]

A modification of the second embodiment will be described. Points of difference from the second embodiment will be explained here. The same reference numbers denote the same parts, and a description thereof will be omitted. In this modification, the data correction unit 292 uses a trilateral filter to remove noise. The trilateral filter used in this modification is expressed as $$P'(i, j) = P(i, j) + \frac{\sum_{k=-m}^{m}\sum_{l=-n}^{n} P\Delta(i, j, k, l)C(k, l)S(P\Delta(i, j, k, l))N(i, j, k, l)}{\sum_{k=-m}^{m}\sum_{l=-n}^{n} C(k, l)S(P\Delta(i, j, k, l))N(i, j, k, l)}, \quad (13)$$

where $P\Delta(i, j, k, l)$ is given by $$P\Delta(i,j,k,l) = P(i+k,j+l) - P_f(i,j,k,l). \quad (14)$$

In addition, $N(i, j, k, l)$ is given by $$N(i, j, k, l) = \begin{cases} 1 & \text{if } \|Q(i+k, j+l) - Q(i, j)\| < Thr \\ 0 & \text{otherwise,} \end{cases} \quad (15)$$

where $Q(i, j)$ is the gradient vector which is given by $$Q(i, j) = \frac{\sum_{k=-m}^{m}\sum_{l=-n}^{n} \nabla P(i+k, j+l) C(k, l)S(\nabla P(i, j) - \nabla P(i+k, j+l))}{\sum_{k=-m}^{m}\sum_{l=-n}^{n} C(k, l)S(\nabla P(i, j) - \nabla P(i+k, j+l))}, \quad (16)$$

where $P_f(i, j, k, l)$ is given by $$P_f(i,j,k,l) = P(i,j) + Q(i,j)_i \cdot k + Q(i,j)_j \cdot k, \quad (17)$$

where $Q(i, j)_i$ is the horizontal component of the gradient, and $Q(i, j)_j$ is the vertical component of the gradient.

This trilateral filter applies the bilateral filter used in the second embodiment to a gradient $\nabla P(i, j)$. Introducing $\nabla P(i, j)$ allows to strongly suppress impulse noise, that is, an isolated variation component.

Even in this modification, $C(k, l)$ and $S(P_1-P_2)$ determined in accordance with the cutoff frequency Fc of the optical system are used, as in the second embodiment. As a result, the same effects as in the second embodiment can be obtained.

[Third Embodiment]

Figure 6:
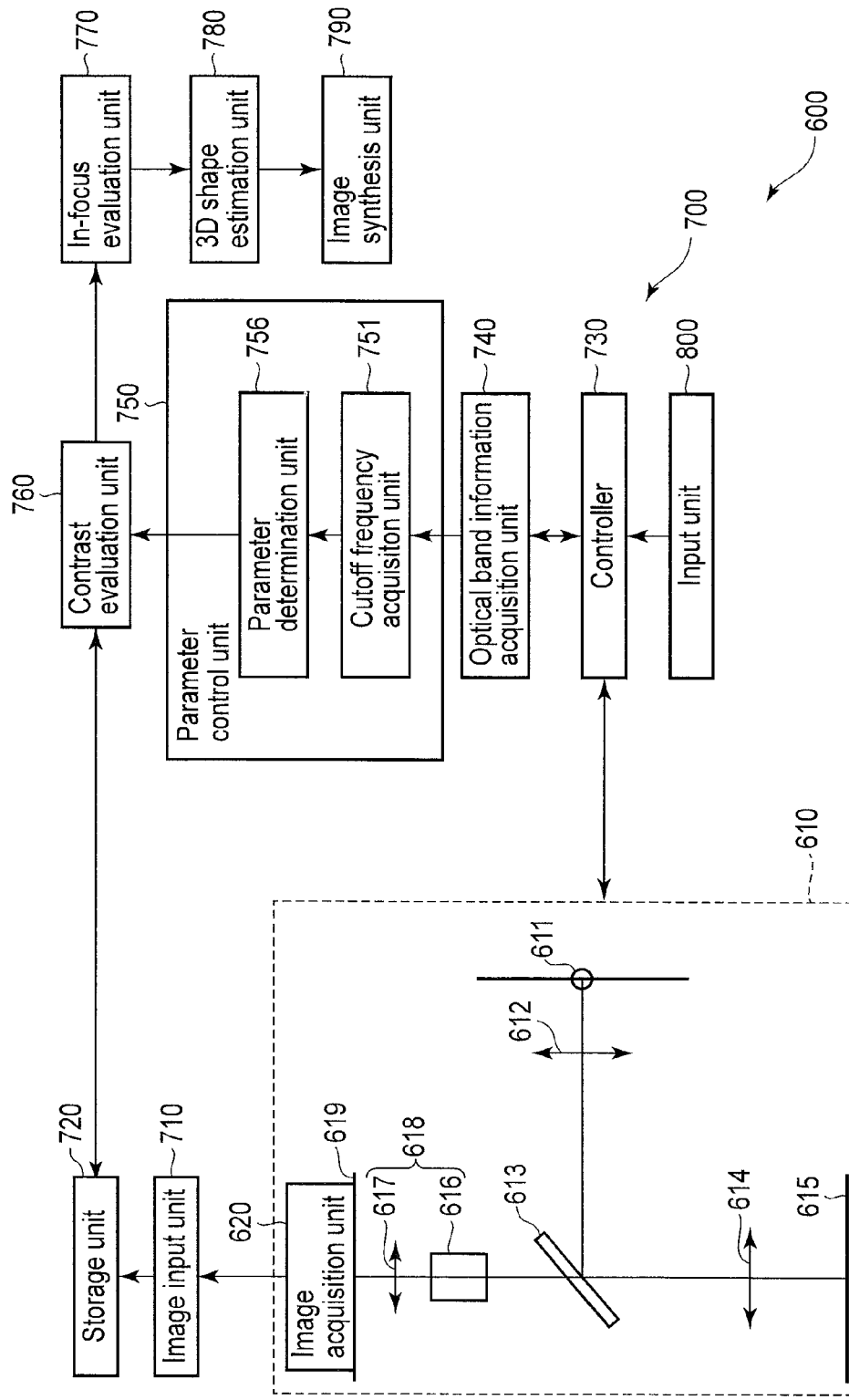
FIG. 6 is a block diagram showing an example of a configuration of a microscope system according to a third embodiment.

The third embodiment of the present invention will be described with reference to the accompanying drawing. FIG. 6 shows the outline of an example of the configuration of a microscope system 600 according to this embodiment. As shown in FIG. 6, the microscope system 600 includes a microscope 610. The microscope 610 is, for example, a digital microscope. The microscope 610 includes an LED light source 611, an illumination optical system 612, an optical path control element 613, an objective lens 614, a sample surface 615 placed on a stage (not shown), an observation optical system 618, an imaging plane 619, and an image acquisition unit 620. The observation optical system 618 includes a zoom optical system 616 and an imaging optical system 617. The objective lens 614, the optical path control element 613, the zoom optical system 616, and the imaging optical system 617 are arranged in this order on the observation optical path from the sample surface 615 to the imaging plane 619.

Illumination light emitted by the LED light source 611 enters the optical path control element 613 via the illumination optical system 612. The optical path control element 613 reflects the illumination light toward the objective lens 614 on the observation optical path. The illumination light irradiates a sample placed on the sample surface 615 via the objective lens 614.

When irradiated with the illumination light, the sample generates observation light. The observation light is reflected light, fluorescence, or the like. The observation light enters the optical path control element 613. Unlike the illumination light, the optical path control element 613 passes the observation light and makes it enter the observation optical system 618 including the zoom optical system 616 and the imaging optical system 617. The optical path control element 613 is an optical element that reflects or passes incident light in accordance with its characteristic. As the optical path control element 613, for example, a polarizer such as a wire grid or a polarizing beam splitter (PBS), which reflects or passes incident light in accordance with its polarization direction is used. Note that as the optical path control element 613, for example, a dichroic mirror that reflects or passes incident light in accordance with its frequency may be used.

The observation optical system 618 condenses the observation light on the imaging plane 619, and forms an image of the sample on the imaging plane 619. The image acquisition unit 620 generates an image signal based on the image formed on the imaging plane 619, and outputs the image signal as a microscopic image.

The microscope system 600 includes an image processing system 700 including an image input unit 710, a storage unit 720, a controller 730, an optical band information acquisition unit 740, a parameter control unit 750, a contrast evaluation unit 760, an in-focus evaluation unit 770, a 3D shape estimation unit 780, an image synthesis unit 790, and an input unit 800. The image input unit 710 acquires a microscopic image from the image acquisition unit 620, and outputs the acquired microscopic image to the storage unit 720. The storage unit 720 temporarily stores the input microscopic image. In response to a request from the contrast evaluation unit 760, the storage unit 720 outputs the stored microscopic image to the contrast evaluation unit 760.

The input unit 800 receives, for example, a user instruction concerning the operation of the microscope system 600. The input unit 800 outputs the received user instruction to the controller 730. The controller 730 controls the operations of the respective units of the microscope 610. In the control of the microscope 610, the controller 730 uses the user instruction input from the input unit 800. In this embodiment, the microscope system 600 acquires a plurality of microscopic images of a single sample captured on different focal planes. Hence, the controller 730 causes the image acquisition unit 620 to acquire the image of the sample on each focal plane while controlling the optical system of the microscope 610 to gradually change the focal plane. More specifically, for example, the controller 730 causes the image acquisition unit 620 to acquire each image while changing the height of the stage, the height of the objective lens, or the position of the focus lens of the microscope 610. As a result, the storage unit 720 stores a plurality of microscopic images having different focal planes for a single sample.

In response to a request from the optical band information acquisition unit 740, the controller 730 outputs the parameters of various kinds of optical systems of the microscope 610 to the optical band information acquisition unit 740. The parameters of the optical systems include, for example, the parameters of the objective optical system, the illumination optical system, the zoom optical system, and the imaging optical system. Note that the controller 730 controls the optical systems of the microscope 610 and therefore has the information of the parameters of the optical systems.

The optical band information acquisition unit 740 acquires the parameter of various kinds of optical systems from the controller 730. The optical band information acquisition unit 740 outputs the acquired parameters of the optical system to the parameter control unit 750. The parameter control unit 750 includes a cutoff frequency acquisition unit 751 and a parameter determination unit 756. The cutoff frequency acquisition unit 751 acquires the parameters of the optical system input from the optical band information acquisition unit 740. The cutoff frequency acquisition unit 751 acquires information of the cutoff frequency of the optical system to be described later based on the acquired parameters of the optical system. The cutoff frequency acquisition unit 751 outputs the acquired cutoff frequency of the optical system to the parameter determination unit 756. The parameter determination unit 756 determines a contrast evaluation parameter to be used by the contrast evaluation unit 760 based on the acquired cutoff frequency of the optical system, and outputs the determined contrast evaluation parameter to the contrast evaluation unit 760.

The contrast evaluation unit 760 acquires the contrast evaluation parameter from the parameter determination unit 756, and acquires the plurality of microscopic images having different focal planes from the storage unit 720. The contrast evaluation unit 760 calculates, for each of the plurality of acquired microscopic images, the contrast evaluation value at each position in the microscopic image based on the acquired contrast evaluation parameter. The contrast evaluation value will be described later in detail. The contrast evaluation unit 760 outputs the microscopic images and the calculated contrast evaluation values to the in-focus evaluation unit 770.

The in-focus evaluation unit 770 evaluates the in-focus state of each pixel in each of the plurality of microscopic images based on the contrast evaluation values input from the contrast evaluation unit 760, and selects a pixel in focus. The in-focus evaluation unit 770 estimates the height corresponding to each pixel of the image based on the pixel in focus and information of the focal plane when the image has been captured. The in-focus evaluation unit 770 outputs the in-focus evaluation result, the height information of each pixel of the image, and the plurality of microscopic images to the 3D shape estimation unit 780.

The 3D shape estimation unit 780 optimizes the height information based on the height information input from the in-focus evaluation unit 770 and estimates the 3D shape of the sample. The 3D shape estimation unit 780 outputs the estimated 3D shape of the sample and the plurality of microscopic images to the image synthesis unit 790. The image synthesis unit 790 synthesizes a synthesized image based on the 3D shape of the sample and the plurality of microscopic images having different focal planes input from the 3D shape estimation unit 780. This synthesized image is, for example, a 3D reconstructed image or an all-in-focus image. The image synthesis unit 790 outputs the created synthesized image to, for example, a display unit to display it, or outputs the synthesized image to, for example, a storage device to store it.

Figure 7:
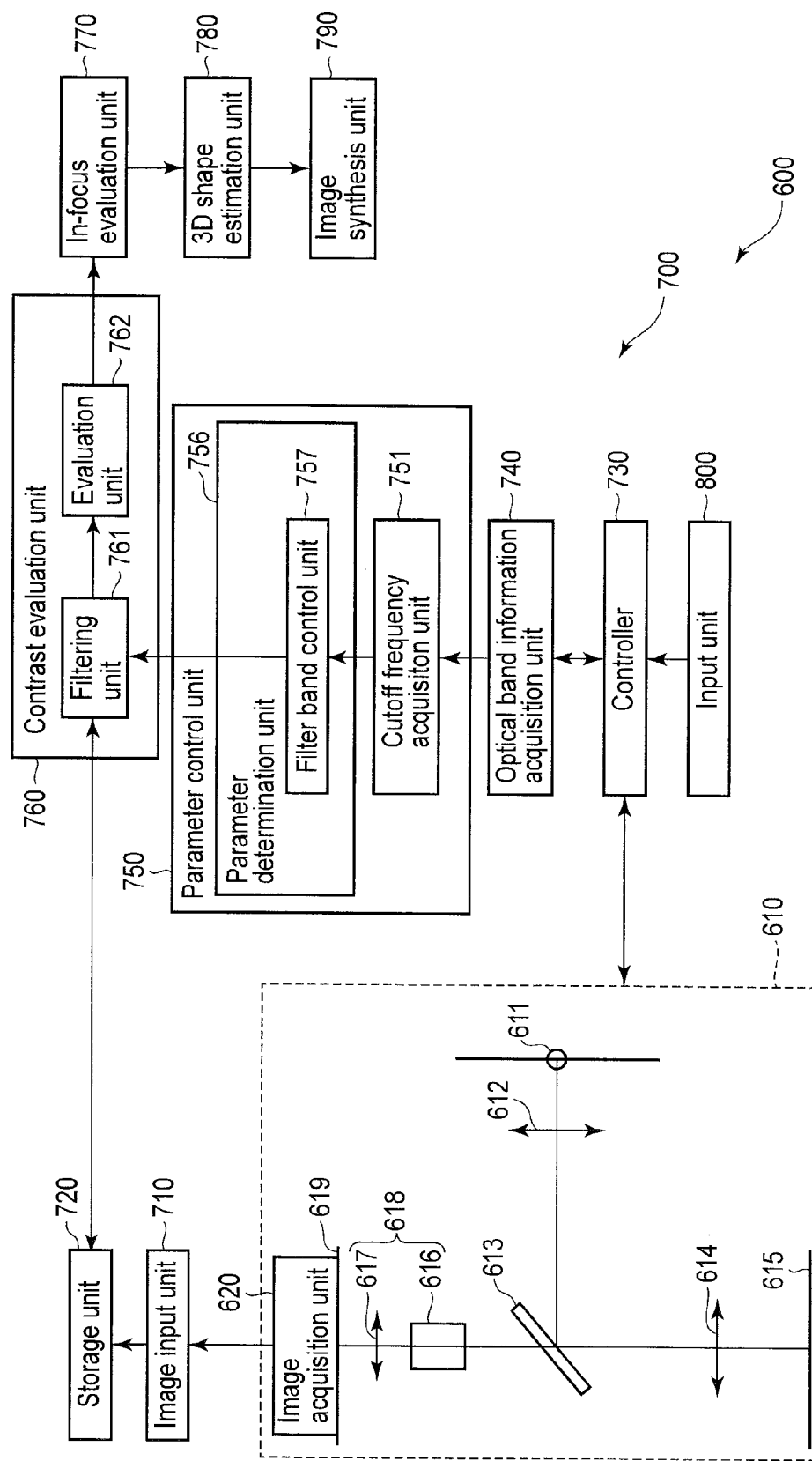
FIG. 7 is a block diagram showing an example of a configuration of the microscope system according to the third embodiment.

The microscope system 600 according to this embodiment will be described in more detail. FIG. 7 shows the outline of the configuration of the microscope system 600 according to this embodiment. Note that the same components as in FIG. 6 denote the same processes, and a description thereof will be omitted. In this embodiment, the parameter determination unit 756 includes a filter band control unit 757, as shown in FIG. 7. The filter band control unit 757 calculates the band of a filter based on the cutoff frequency of the optical system, and determines a filter functioning as the contrast evaluation parameter.

In this embodiment, the contrast evaluation unit 760 includes a filtering unit 761 and an evaluation unit 762. The filtering unit 761 performs filtering processing for each microscopic image using a filter determined by the filter band control unit 757. The evaluation unit 762 evaluates the contrast of each image based on the result of filtering processing by the filtering unit 761.

The operation of the microscope system 600 according to this embodiment will be described. A sample having the sample surface 615 is placed on a stage (not shown). The controller 730 controls the microscope 610. The controller 730 gradually changes the focal plane of the optical system for the sample by, for example, gradually changing the position of the sample surface 615 in the optical axis direction. More specifically, for example, the controller 730 changes the height of the stage, the height of the objective lens, or the position of the focus lens of the microscope 610. At this time, the controller 730 causes the image acquisition unit 620 to sequentially acquire the microscopic image of the sample on each focal plane. The image input unit 710 acquires the microscopic image of the sample on each focal plane from the image acquisition unit 620. The image input unit 710 outputs the acquired microscopic images to the storage unit 720. The storage unit 720 stores the plurality of microscopic images input from the image input unit 710.

In response to a request from the optical band information acquisition unit 740, the controller 730 outputs information about various kinds of optical systems of the microscope 610 at the time of microscopic image acquisition to the optical band information acquisition unit 740. The optical band information acquisition unit 740 acquires a numerical aperture $NA_{obj}$ of the objective lens 614, an image magnification $\beta$ that is the total magnification of the observation optical system 618, and a wavelength $\lambda$ of illumination light emitted by the LED light source 611, which are the parameters of the optical system. The optical band information acquisition unit 740 outputs these optical system parameters to the cutoff frequency acquisition unit 751.

The cutoff frequency acquisition unit 751 calculates a cutoff frequency Fc using the acquired optical system parameters based on, for example, $$Fc = \frac{2 \cdot NA_{obj}}{\beta \cdot \lambda}. \tag{18}$$

Note that strictly speaking, not only the numerical aperture of the objective lens but also that of the condenser lens on the illumination side is also related to the numerical aperture. However, here is assumed a case in which the illumination is incoherent, the sample is a scatterer, and the numerical aperture on the illumination side need not be taken into consideration.

Note that many high frequency components are included when the image magnification $\beta$ is low, that is, at a low magnification, and the number of high frequency components decreases when the image magnification $\beta$ is high, that is, at a high magnification. Equation (18) also indicates this well.

The relationship between the frequency and contrast according to the image magnification β when the modulation transfer function (MTF) of the lens is not taken into consideration is the same as that described with reference to FIG. 2. A contrast C is given by equation (2) described above.

A frequency at which the contrast is zero is defined as the cutoff frequency Fc. The cutoff frequency acquisition unit 751 outputs the calculated cutoff frequency Fc to the filter band control unit 757 of the parameter determination unit 756. Note that the wavelength λ need not always be the wavelength of the illumination light and may be a predetermined value such as 550 nm.

The filter band control unit 757 calculates parameters A1, A2, and A3 using the cutoff frequency Fc input from the optical band information acquisition unit 740 based on, for example, $$A1 = \frac{F1}{F1 + Fc} \quad (19)$$
$$A2 = 1 - A1$$
$$A3 = 1,$$

where F1 is a predetermined constant, and A1+A2=A3.

Figures 8, 9:
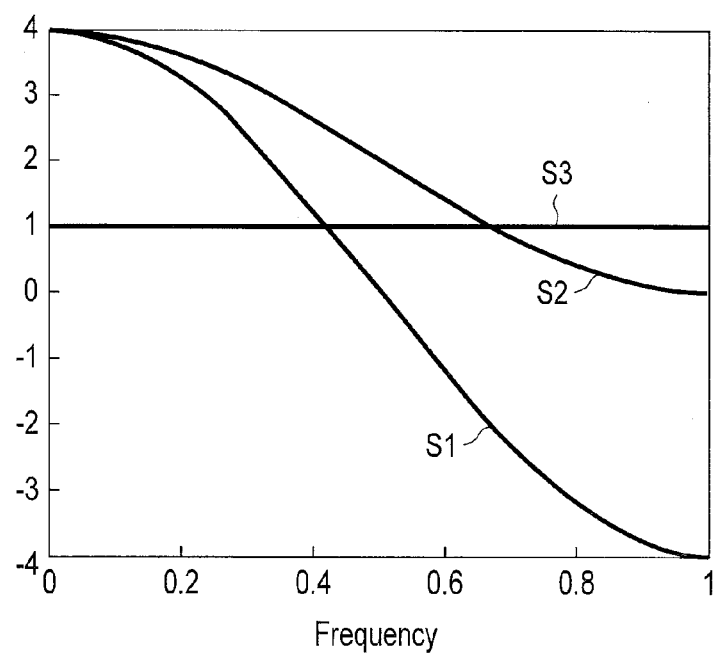
FIG. 8 is a view showing an example of a configuration of a filter kernel according to the third embodiment.
FIG. 9 is a graph showing the outline of an example of the frequency characteristic of each filter kernel according to the third embodiment.

The filter band control unit 757 creates a filter kernel K serving as a contrast evaluation parameter as shown on the left-hand side in FIG. 8 using the parameters A1, A2, and A3, and a first filter kernel K1, a second filter kernel K2, and a third filter kernel K3 shown on the right-hand side in FIG. 8. Let S1 be the spectrum of the first filter kernel K1; S2, the spectrum of the second filter kernel K2; and S3, the spectrum of the third filter kernel K3. FIG. 9 shows the outline of an example of each spectrum. As shown in FIG. 9, the filter kernels have a high gain for a high frequency in the order of third filter kernel K3>second filter kernel K2>first filter kernel K1.

As indicated by equations (19), the higher the cutoff frequency Fc is, that is, the higher the band of the optical system of the microscope 610 is, the smaller A1 is, and the larger A2 is. Hence, the weight of the second filter kernel K2 having a high gain for a high frequency increases as the band of the optical system of the microscope 610 becomes high. That is, the higher the band of the optical system of the microscope 610 is, the higher the gain of the filter kernel K is for a high frequency. The filter band control unit 757 outputs the created filter kernel K to the filtering unit 761 in the contrast evaluation unit 760.

The filtering unit 761 acquires the plurality of microscopic images having different focal planes from the storage unit 720. The filtering unit 761 performs filtering processing for each pixel in each of the microscopic images using the filter kernel K input from the filter band control unit 757. The filtering unit 761 outputs the microscopic images before the filtering processing and the results of the filtering processing to the evaluation unit 762 in the contrast evaluation unit 760.

The evaluation unit 762 calculates a contrast evaluation value for each pixel of each microscopic image based on the result of the filtering processing input from the filtering unit 761. The evaluation unit 762 outputs the calculated contrast evaluation value of each pixel and the microscopic images to the in-focus evaluation unit 770.

The in-focus evaluation unit 770 evaluates the in-focus state based on the contrast evaluation values acquired from the evaluation unit 762. For example, the in-focus evaluation unit 770 specifies, for each of the plurality of microscopic images having different focal planes, a pixel having a contrast evaluation value larger than a predetermined threshold as a pixel in focus. Based on the pixel in focus out of the plurality of microscopic images having different focal planes and information about the focal plane when the image including the pixel has been acquired, the in-focus evaluation unit 770 estimates the height of the sample at a point corresponding to the pixel. The in-focus evaluation unit 770 outputs height information for each pixel and the plurality of microscopic images having different focal planes to the 3D shape estimation unit 780.

The 3D shape estimation unit 780 optimizes the height information by, for example, smoothing based on the information about the height of the sample input from the in-focus evaluation unit 770, and estimates the 3D shape of the sample. The 3D shape estimation unit 780 outputs the estimated 3D shape of the sample and the plurality of microscopic images having different focal planes to the image synthesis unit 790.

The image synthesis unit 790 synthesizes a synthesized image based on the 3D shape of the sample and the plurality of microscopic images having different focal planes input from the 3D shape estimation unit 780. If the synthesized image is, for example, a 3D reconstructed image, the synthesized image is created by synthesizing the 3D shape with the in-focus images concerning the respective portions of the 3D shape. If the synthesized image is, for example, an all-in-focus image, images extracted from microscopic images having focal planes corresponding to the heights of the respective pixels are combined, thereby synthesizing an image that is in focus for all pixels. The image synthesis unit 790 outputs the created synthesized image to a display unit or a storage device. Since a normal microscopic image has a shallow depth of field, it is difficult for the user to recognize, by the normal microscopic image, the image of a sample whose height is greater than the depth of field. However, by a 3D reconstructed image or an all-in-focus image, the user can easily recognize the image of a sample whose height is greater than the depth of field.

As described above, for example, the image input unit 710 functions as an acquisition unit configured to acquire an image of a sample via an optical system. For example, the cutoff frequency acquisition unit 751 functions as a cutoff frequency acquisition unit configured to acquire the cutoff frequency of the image based on information of the optical system. For example, the parameter determination unit 756 functions as a parameter determination unit configured to determine, based on the cutoff frequency, an evaluation parameter to be used for contrast evaluation of the image. For example, the contrast evaluation unit 760 functions as a contrast evaluation unit configured to perform contrast evaluation of the image based on the determined evaluation parameter and calculate a contrast evaluation value. For example, the in-focus evaluation unit 770 functions as an in-focus evaluation unit configured to evaluate the in-focus state of an image based on the contrast evaluation value. For example, the image synthesis unit 790 functions as an all-in-focus image creation unit or a 3D reconstructed image creation unit.

According to this embodiment, the filtering unit 761 performs filtering processing using a filter created by the filter band control unit 757. The filter band control unit 757 determines the filter using the parameters of the optical system of the microscope 610. In general, a more accurate evaluation result can be obtained for contrast evaluation by using a filter having a high spectrum for a high frequency. On the other hand, if a filter having a frequency higher than the band of the optical system of the microscope 610 is used, an incorrect contrast evaluation value is obtained because of a factor such as noise that is not related to the object structure. According to this embodiment, the filter is created in consideration of the band of the optical system of the microscope 610 such that a frequency as high as possible is used out of the band obtained by the microscope 610. For this reason, more accurate contrast evaluation can be performed. This allows the microscope system 600 to create an accurate 3D reconstructed image or all-in-focus image. When a zoom optical system is included in the optical systems of the microscope 610, the numerical aperture and the band of a microscopic image change in accordance with the focal length of the zoom optical system. Hence, this embodiment is particularly effective.

Note that in this embodiment, each pixel is assumed to be in focus in any one of the plurality of microscopic images. Hence, evaluating the cutoff frequency Fc by equation (18) poses no problem. Additionally, in this embodiment, the filtering processing is performed for each pixel. However, the filtering processing may be performed for each pixel region including a plurality of pixels.

In this embodiment, a change in the band depending on the sample is not taken into consideration. However, the band of an acquired microscopic image changes depending on the type of the medium of the sample, the thickness of the slice, or the like. Such a difference in the image band resulting from the difference in the sample may be considered when acquiring the cutoff frequency. In addition, when, for example, observing the interconnection pattern of a semiconductor, the interconnection pattern interval is known in advance depending on the sample. For example, the interval may be taken into consideration regarding the image band. If the sample characteristic is considered, the input unit 800 acquires information about the sample input by the user and outputs it to the controller 730. The cutoff frequency acquisition unit 751 acquires the sample information from the controller 730 via the optical band information acquisition unit 740 together with the parameters of the optical system of the microscope 610. The cutoff frequency acquisition unit 751 acquires the cutoff frequency Fc in consideration of the parameters of the optical system and the sample characteristic. When the cutoff frequency Fc is determined in consideration of the sample characteristic, the contrast evaluation accuracy is further improved. That is, for example, the input unit 800 functions as a sample information acquisition unit configured to acquire the optical characteristic information of the sample.

[Modification of Third Embodiment]

Figure 10:
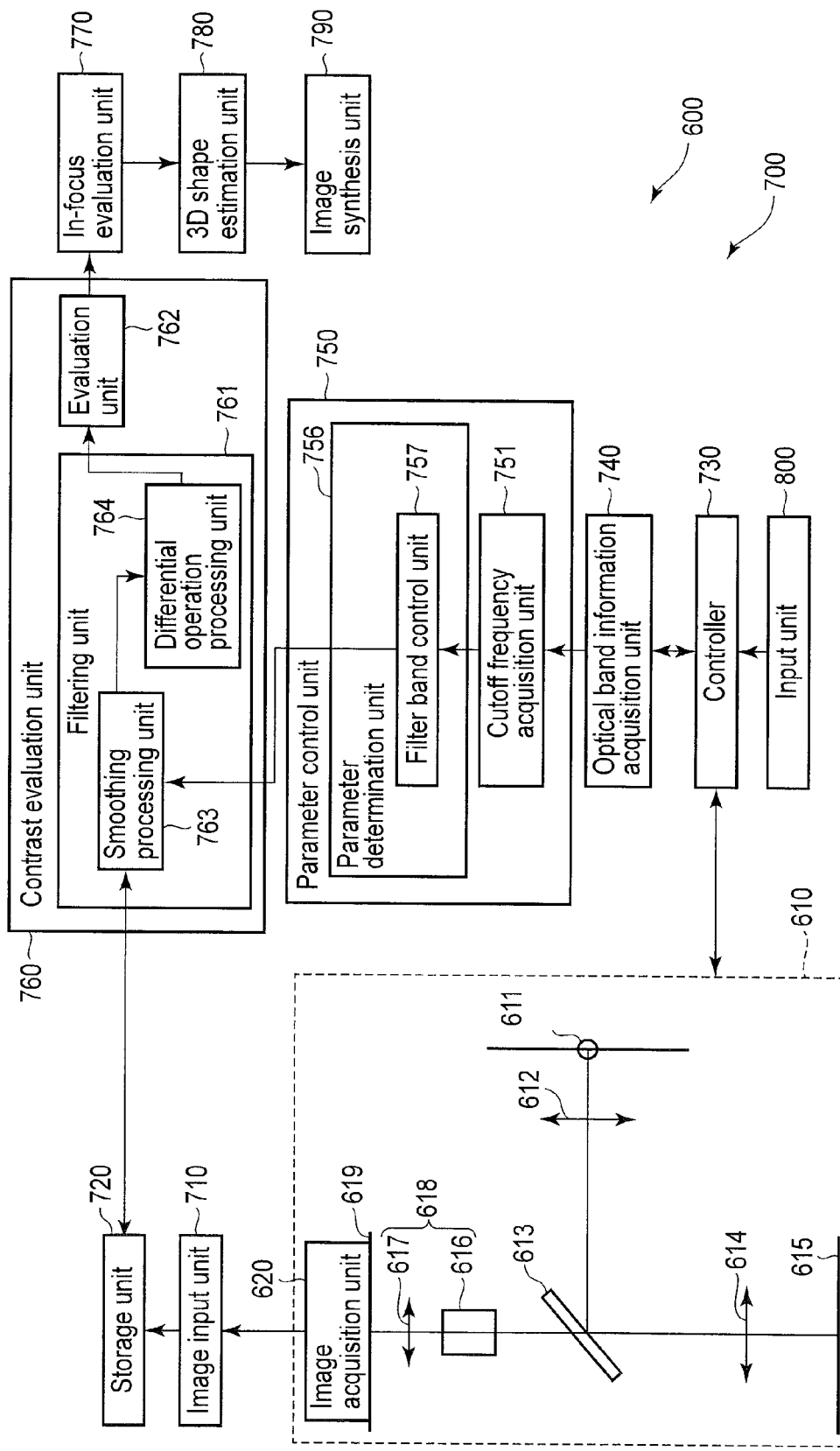
FIG. 10 is a block diagram showing an example of a configuration of a microscope system according to a modification of the third embodiment.

A modification of the third embodiment will be described. Points of difference from the third embodiment will be explained here. The same reference numbers denote the same parts, and a description thereof will be omitted. FIG. 10 shows the outline of an example of the arrangement of a microscope system according to this modification. As shown in FIG. 10, the filtering unit 761 according to this modification is provided with a smoothing processing unit 763 and a differential operation processing unit 764.

The smoothing processing unit 763 according to this modification performs filtering processing using a Gaussian filter. For this purpose, the filter band control unit 757 creates, using the cutoff frequency Fc acquired from the cutoff frequency acquisition unit 751, a Gaussian filter G serving as a contrast evaluation parameter and given by, for example, $$G = \begin{bmatrix} a_{-2,-2} & a_{-1,-2} & a_{0,-2} & a_{1,-2} & a_{2,-2} \\ a_{-2,-1} & a_{-1,-1} & a_{0,-1} & a_{1,-1} & a_{2,-1} \\ a_{-2,0} & a_{-1,0} & a_{0,0} & a_{1,0} & a_{2,0} \\ a_{-2,1} & a_{-1,1} & a_{0,1} & a_{1,1} & a_{2,1} \\ a_{-2,2} & a_{-1,2} & a_{0,2} & a_{1,2} & a_{2,2} \end{bmatrix} = \quad (20)$$

$$\frac{A4}{2724} \begin{bmatrix} 6 & 15 & 20 & 15 & 6 \\ 15 & 225 & 300 & 225 & 15 \\ 20 & 300 & 400 & 300 & 20 \\ 15 & 225 & 300 & 225 & 15 \\ 6 & 15 & 20 & 15 & 6 \end{bmatrix} +$$

$$\frac{A5}{256} \begin{bmatrix} 1 & 4 & 6 & 4 & 1 \\ 4 & 16 & 24 & 16 & 4 \\ 6 & 24 & 36 & 24 & 6 \\ 4 & 16 & 24 & 16 & 4 \\ 1 & 4 & 6 & 4 & 1 \end{bmatrix} + \frac{A6}{16} \begin{bmatrix} 0 & 0 & 0 & 0 & 0 \\ 0 & 1 & 2 & 1 & 0 \\ 0 & 2 & 4 & 2 & 0 \\ 0 & 1 & 2 & 1 & 0 \\ 0 & 0 & 0 & 0 & 0 \end{bmatrix},$$

where A4, A5, and A6 are given by $$A4 = \frac{F3}{F2 + F3 + 2Fc} \quad (21)$$

$$A5 = \frac{Fc}{F2 + F3 + 2Fc}$$

$$A6 = \frac{Fc + F2}{F2 + F3 + 2Fc},$$

where F2 and F3 are predetermined constants.

Figure 11:
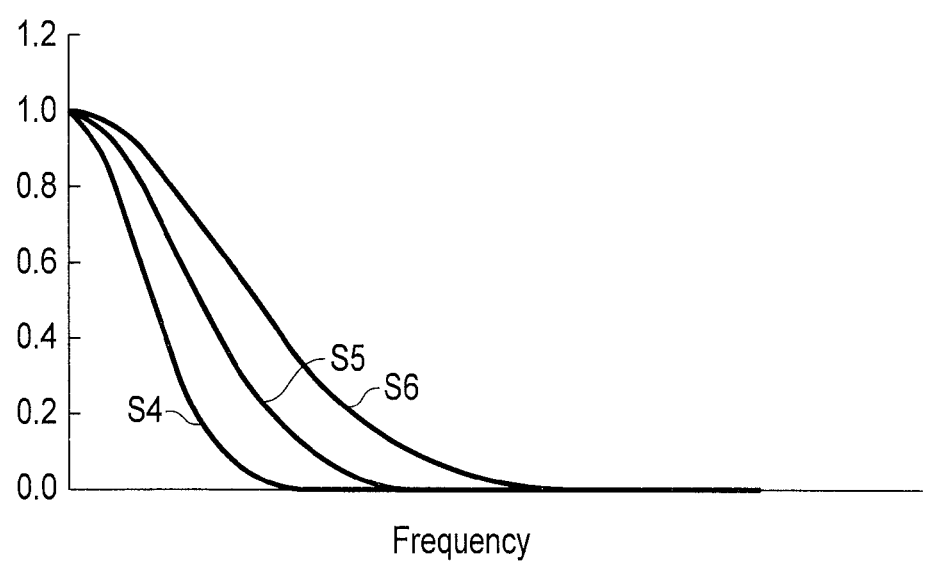
FIG. 11 is a graph showing the outline of an example of the frequency characteristic of each filter according to the modification of the third embodiment.

FIG. 11 shows the outline of a frequency characteristic S4 of the first term of the second equation of equation (20), a frequency characteristic S5 of the second term, and a frequency characteristic S6 of the third term. As shown in FIG. 11, the characteristics represent a high gain for a high frequency in the order of the frequency characteristic S6 of the third term>the frequency characteristic S5 of the second term>the frequency characteristic S4 of the first term. As indicated by equations (21), the higher the cutoff frequency Fc is, that is, the higher the band of the optical system of the microscope 610 is, the smaller A4 is, and the larger A5 an A6 are. Hence, the Gaussian filter G attains a high gain for a high frequency as the band of the optical system of the microscope 610 becomes high.

In this modification, the filter band control unit 757 outputs the Gaussian filter G given by equation (20) to the smoothing processing unit 763. The smoothing processing unit 763 performs filtering processing for each pixel of the microscopic images acquired from the storage unit 720 using the Gaussian filter G represented by equations (21), which is input from the filter band control unit 757. The smoothing processing unit 763 outputs the result of the filtering processing using the Gaussian filter G to the differential operation processing unit 764.

The differential operation processing unit 764 performs filtering processing using a Laplacian filter for the result input from the smoothing processing unit 763. The differential operation processing unit 764 uses a Laplacian filter L given by, for example, $$L = \begin{bmatrix} 0 & -1 & 0 \\ -1 & 4 & -1 \\ 0 & -1 & 0 \end{bmatrix}. \quad (22)$$

The differential operation processing unit 764 outputs the result of the filtering processing using the Laplacian filter L to the evaluation unit 762. That is, an image $I_{in}$ input to the filtering unit 761 including the smoothing processing unit 763 and the differential operation processing unit 764 becomes $I_{out}$ given by $$I_{out} = L * G * I_{In}, \quad (23)$$

where * represents convolution.

$I_{out}$ is input to the evaluation unit 762. Using $I_{out}$, the evaluation unit 762 evaluates the in-focus state using the sum of the absolute values of $I_{out}$ in a predetermined region. That is, a contrast evaluation value P(x, y) is given by $$P(x, y) = \sum_{i,j \in M_{x,y}} I_{out}(i, j), \quad (24)$$

where x and y represent a block position, and i and j represent a pixel position. The evaluation unit 762 outputs the calculated contrast evaluation value P(x, y) of each pixel and the microscopic images to the in-focus evaluation unit 770. The rest of the operation is the same as in the third embodiment.

According to this modification as well, the Gaussian filter G represented by, for example, equation (20) is adjusted in accordance with the parameters of the optical system. Hence, the microscope system 600 can perform accurate contrast evaluation, as in the third embodiment, and the same effects as in the third embodiment can be obtained.

[Fourth Embodiment]

Figure 12:
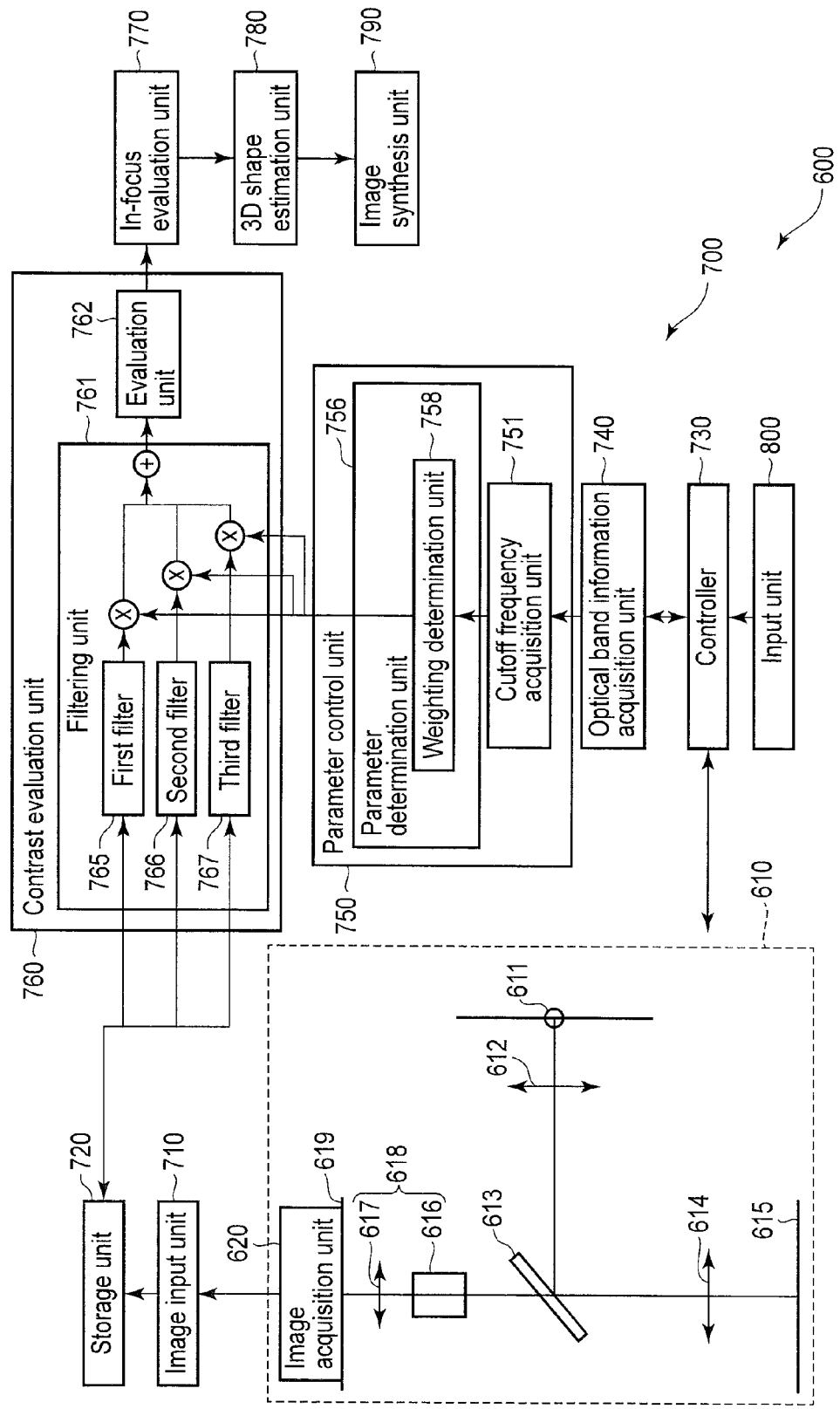
FIG. 12 is a block diagram showing an example of a configuration of a microscope system according to a forth embodiment.

The fourth embodiment of the present invention will be described. Points of difference from the third embodiment will be explained here. The same reference numbers denote the same parts, and a description thereof will be omitted. FIG. 12 shows the outline of an example of the configuration of a microscope system 600 according to this embodiment. As shown in FIG. 12, a filtering unit 761 according to this embodiment includes a filter bank. That is, the filtering unit 761 includes a first filter 765, a second filter 766, and a third filter 767. A parameter determination unit 756 includes a weighting determination unit 758.

Based on a cutoff frequency Fc acquired from a cutoff frequency acquisition unit 751, the weighting determination unit 758 in the parameter determination unit 756 calculates weighting coefficients A7, A8, and A9 serving as contrast evaluation parameters by $$A7 = \frac{F6}{F5 + F6 + 2Fc} \quad (25)$$

$$A8 = \frac{Fc + F5}{F5 + F6 + 2Fc}$$

$$A9 = \frac{Fc}{F5 + F6 + 2Fc},$$

where F5 and F6 are predetermined constants. The weighting determination unit 758 outputs the calculated weighting coefficients A7, A8, and A9 to the filtering unit 761.

The first filter 765, the second filter 766, and the third filter 767 included in the filtering unit 761 are predetermined filters that are different from each other. The bands of the filters hold a relationship given by band of first filter 765<band of second filter 766<band of third filter 767. The filtering unit 761 performs filtering processing of microscopic images acquired from a storage unit 720 using the first filter 765, the second filter 766, and the third filter 767.

The filtering unit 761 multiplies the filtering result by the first filter 765 by the weighting coefficient A7 acquired from the weighting determination unit. Similarly, the filtering unit 761 multiplies the filtering result by the second filter 766 by the weighting coefficient A8 and the filtering result by the third filter 767 by the weighting coefficient A9. The filtering unit 761 adds all the products of the filtering results of the respective filters and the weighting coefficients, and outputs the sum to an evaluation unit 762 as the result of the filtering processing.

Note that in this embodiment, A7+A8+A9=1, and the gain is one. As indicated by equations (25), the higher the cutoff frequency Fc is, that is, the higher the band of the optical system of a microscope 610 is, the smaller A7 is, and the larger A8 and A9 are. Hence, the gain for a high frequency becomes large as the band of the optical system of the microscope 610 becomes high.

The evaluation unit 762 calculates a contrast evaluation value for each pixel of each microscopic image based on the result of the filtering processing input from the filtering unit 761. The evaluation unit 762 outputs the calculated contrast evaluation value of each pixel and the microscopic images to an in-focus evaluation unit 770. The rest of the operation is the same as in the third embodiment.

According to this embodiment as well, the result of the filtering processing is adjusted in accordance with the parameters of the optical system, as in the third embodiment. Hence, the microscope system 600 can perform accurate contrast evaluation, as in the third embodiment, and the same effects as in the third embodiment can be obtained.

In this embodiment, the filtering unit 761 includes three filters, that is, the first filter 765, the second filter 766, and the third filter 767. However, any number of filters can be included. Additionally, in this embodiment, the result of filtering processing by each filter is multiplied by a corresponding weighting coefficient. However, any other method is usable as far as each weighting coefficient is reflected on a corresponding result of filtering processing. For example, each filter may be configured to be corrected by a corresponding weighting coefficient.

[Fifth Embodiment]

Figure 13:
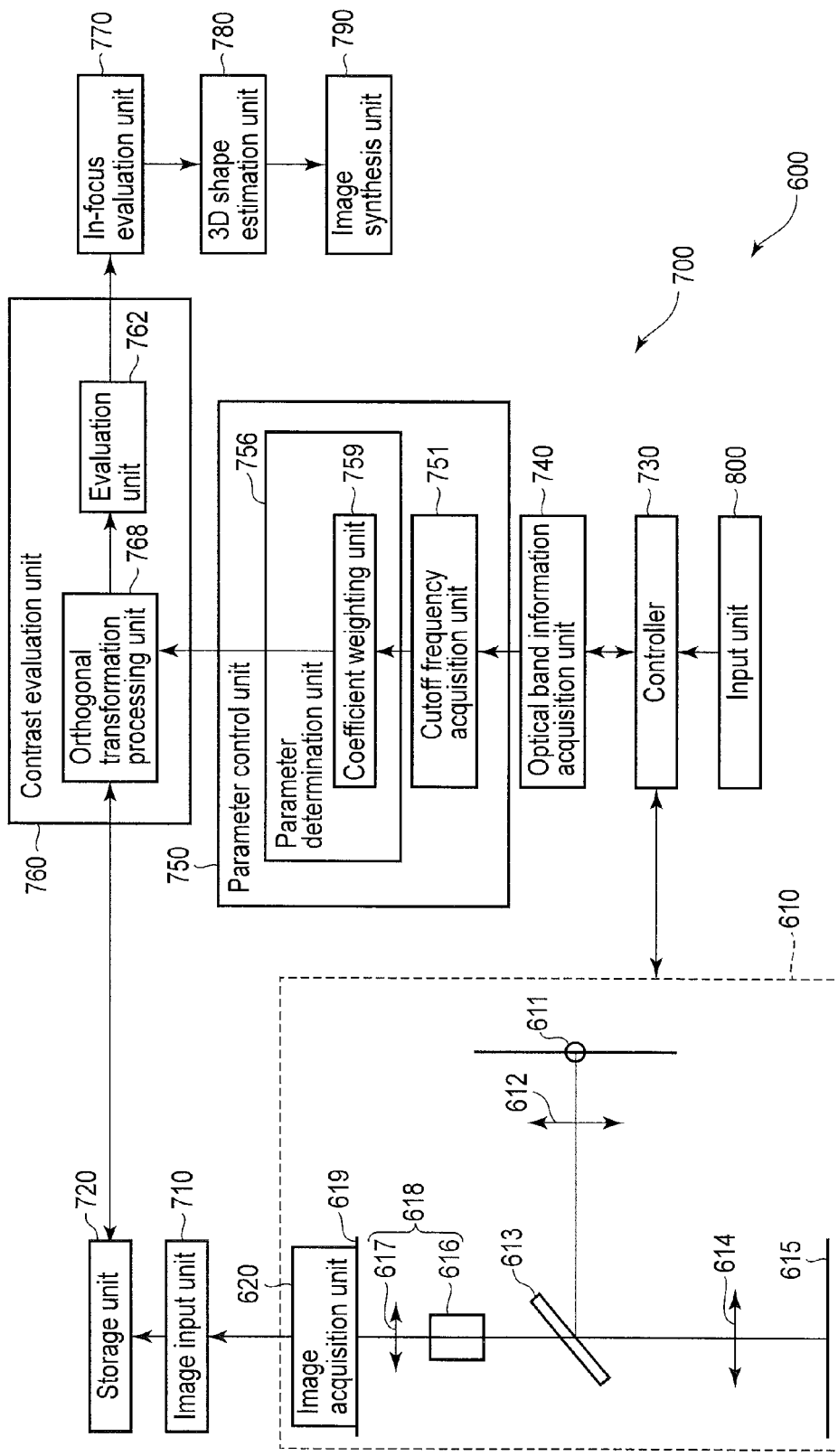
FIG. 13 is a block diagram showing an example of a configuration of a microscope system according to a fifth embodiment.

The fifth embodiment of the present invention will be described. Points of difference from the third embodiment will be explained here. The same reference numbers denote the same parts, and a description thereof will be omitted. In this embodiment, a contrast evaluation unit 760 uses frequency resolution by orthonormal basis transformation. FIG. 13 shows the outline of an example of the configuration of a microscope system 600 according to this embodiment. As shown in FIG. 13, a parameter determination unit 756 includes a coefficient weighting unit 759. The contrast evaluation unit includes an orthogonal transformation processing unit 768 and an evaluation unit 762.

The orthogonal transformation processing unit 768 in the contrast evaluation unit 760 performs, for example, discrete cosine transform (DCT) processing for a microscopic image acquired from a storage unit 720. The orthogonal transformation processing unit 768 performs the DCT processing for, for example, each cell of 8 pixels×8 pixels of the microscopic image. With the DCT by the orthogonal transformation processing unit 768, a table of DCT as shown in, for example, FIG. 14 is obtained for each cell. In the table shown in FIG. 14, the intensity for each vertical frequency is represented in the horizontal direction. The frequency indicated decreases leftward and increases rightward. On the other hand, in the table shown in FIG. 14, the intensity for each horizontal frequency is represented in the horizontal direction. The frequency indicated decreases upward and increases downward.

The orthogonal transformation processing unit 768 performs quantization using a quantization table for the table obtained after the DCT processing as shown in FIG. 14. In addition, the orthogonal transformation processing unit 768 acquires a cutoff coefficient serving as a contrast evaluation parameter from the coefficient weighting unit 759 in a parameter control unit 750.

The coefficient weighting unit 759 in the parameter control unit 750 acquires a cutoff frequency Fc from a cutoff frequency acquisition unit 751. The coefficient weighting unit 759 compares the cutoff frequency Fc with F7+n×F8, thereby determining the cutoff coefficient. F7 and F8 are predetermined constants. The cutoff coefficient is determined, for example, in the follow way.

When Fc>F7+F8, cutoff coefficient=A10,
when Fc>F7+2×F8, cutoff coefficient=A11,
when Fc>F7+3×F8, cutoff coefficient=A12, and
when Fc>F7+4×F8, cutoff coefficient=A13. A10, A11, A12, and A13 are predetermined constants. The cutoff coefficient is set to be lower as the cutoff frequency Fc becomes low. The coefficient weighting unit 759 outputs the determined cutoff coefficient to the orthogonal transformation processing unit 768.

Upon acquiring the cutoff coefficient from the coefficient weighting unit 759, the orthogonal transformation processing unit 768 performs the following processing for the table quantized using the quantization table. The upper left corner of the table is set as the origin. Let p be a horizontal position, and q be a vertical position. When p+q is greater than the cutoff coefficient, the value, that is, the DCT coefficient is set to zero. As a result, a quantized table as shown in, for example, FIG. 15 is obtained. In the example of FIG. 15, the cutoff coefficient is 6. When p+q is greater than 6, the DCT coefficient is zero. The orthogonal transformation processing unit 768 outputs the quantized table as shown in FIG. 15 to the evaluation unit 762.

The evaluation unit 762 calculates a contrast evaluation value for each cell of each microscopic image based on the quantized table input from the orthogonal transformation processing unit 768. The evaluation unit 762 outputs the calculated contrast evaluation value of each cell and the microscopic images to an in-focus evaluation unit 770. The rest of the operation is the same as in the third embodiment.

According to this embodiment as well, the DCT coefficient changes in accordance with the parameters of the optical system, as in the third embodiment. For example, when the cutoff frequency Fc is low, the number of DCT coefficients that become zero is large. As a result, the microscope system 600 can perform accurate contrast evaluation, and the same effects as in the third embodiment can be obtained.

The method of determining the DCT coefficient as zero is merely an example, and any other method can be used as far as it determines to leave only the DCT coefficients of low frequencies and set the DCT coefficients of high frequencies to zero as the cutoff frequency Fc becomes low. In addition to setting a DCT coefficient to zero, the weight coefficient to multiply a DCT coefficient may be changed such that the influence of the DCT coefficients of high frequencies becomes small as the cutoff frequency becomes low. In place of DCT, Hadamard transformation or wavelet transformation may be used. Even when Hadamard transformation or Wavelet transformation is used, the same effects as in this embodiment can be obtained.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing system comprising:
    an image acquisition unit configured to acquire a plurality of images of a sample taken via an optical system comprising an objective lens;
    a shape candidate value estimation unit configured to estimate a shape candidate value of a 3D shape of the sample based on the plurality of images, wherein the shape candidate value of the 3D shape includes a height of the sample;
    a parameter determination unit comprising a cutoff frequency acquisition unit configured to acquire parameter information of the optical system that includes a numerical aperture $NA_{obj}$ of the objective lens and to calculate a cutoff frequency of the optical system based on the parameter information of the optical system, wherein the parameter determination unit is configured to determine a correction parameter and an interpolation parameter for the shape candidate value based on the cutoff frequency; and
    a data correction unit configured to perform data correction and data interpolation for the shape candidate value using the correction parameter and the interpolation parameter to calculate an interpolated shape candidate value,
        wherein the data correction comprises suppressing an isolated variation component included in the shape candidate value, and
        wherein the data interpolation comprises interpolating a value of an inestimable pixel among the shape candidate value after the data correction.

2. The image processing system according to claim 1,
    wherein the image acquisition unit is configured to acquire the plurality of images, wherein the plurality of images have focal positions different from each other for the sample, and
    wherein the shape candidate value estimation unit is configured to estimate the shape candidate value of the 3D shape of the sample based on the plurality of images.

3. The image processing system according to claim 2, further comprising:
    a contrast evaluation unit configured to perform contrast evaluation for each pixel in each of the plurality of images and calculate a contrast evaluation value of each image of the plurality of images,
    wherein the candidate value estimation unit selects a pixel in focus out of the pixels based on the contrast evaluation value and estimates the candidate value of the 3D shape of the sample.

4. The image processing system according to claim 2, further comprising:

an all-in-focus image creation unit configured to create an all-in-focus image based on the interpolated shape candidate value and the plurality of images.

5. The image processing system according to claim 2, further comprising:
a 3D reconstructed image creation unit configured to create a 3D reconstructed image based on the interpolated shape candidate value and the plurality of images.

6. The image processing system according to claim 1, wherein the data correction unit includes an interpolated shape candidate value calculation unit configured to calculate the interpolated shape candidate value using correlation of a local region represented by the shape candidate value, and an area of the local region is determined in accordance with the cutoff frequency.

7. The image processing system according to claim 6, wherein the correlation includes first correlation that is correlation between values of two points and second correlation that is correlation by a distance, and a parameter for calculation of the first correlation and the second correlation is determined in accordance with the cutoff frequency.

8. The image processing system according to claim 7, wherein the interpolated shape candidate value calculation unit is configured to calculate the interpolated shape candidate value using a bilateral filter including the first correlation and the second correlation.

9. The image processing system according to claim 7, wherein the correlation is based on a probability density function.

10. The image processing system according to claim 6, wherein the area is determined to be wider as the cutoff frequency becomes low.

11. The image processing system according to claim 1, wherein the data correction unit is configured to perform noise reduction using correlation of a local region represented by the shape candidate value in the data correction.

12. The image processing system according to claim 11, wherein the data correction unit is configured to suppress the variation component determined as a small amplitude signal in the noise reduction.

13. The image processing system according to claim 1, wherein the data interpolation uses a correlation in distance.

14. The image processing system according to claim 13, wherein the correlation in distance is determined to increase contribution of a wider region as the cutoff frequency becomes low.

15. The image processing system according to claim 1, further comprising:
a 3D shape estimation unit configured to optimize the interpolated shape candidate value and estimate the 3D shape of the sample.

16. The image processing system according to claim 3, further comprising:
a parameter determination unit configured to determine, based on the cutoff frequency, an evaluation parameter to be used for the contrast evaluation of the image, wherein the contrast evaluation unit calculates the contrast evaluation value based on the evaluation parameter, and the candidate value estimation unit includes an in-focus evaluation unit configured to evaluate an in-focus state of the pixel based on the contrast evaluation value.

17. The image processing system according to claim 16, wherein the parameter determination unit determines a band of a filter as the evaluation parameter based on the cutoff frequency, and the contrast evaluation unit performs filtering processing using the filter having the band for the image, and calculates the contrast evaluation value based on a value obtained by the filtering processing.

18. The image processing system according to claim 17, wherein the parameter determination unit determines the band such that the band becomes high as the cutoff frequency becomes high.

19. The image processing system according to claim 16, wherein the contrast evaluation unit includes a plurality of filters having different bands, the parameter determination unit determines a weighting coefficient for each of the plurality of filters as the evaluation parameter based on the cutoff frequency, and the contrast evaluation unit performs filtering processing using the plurality of filters for the image, and calculates the contrast evaluation value by reflecting the weighting coefficient on a value obtained by the filtering processing.

20. The image processing system according to claim 19, wherein the parameter determination unit determines the weighting coefficient such that the weighting coefficient becomes high as the cutoff frequency becomes high.

21. The image processing system according to claim 16, wherein the parameter determination unit determines a cutoff coefficient as the evaluation parameter based on the cutoff frequency, and the contrast evaluation unit acquires an orthonormal basis transformation coefficient by performing orthonormal basis transformation for the image, and calculates the contrast evaluation value by reflecting the cutoff coefficient on the orthonormal basis transformation coefficient.

22. The image processing system according to claim 21, wherein the parameter determination unit determines the cutoff coefficient such that a weight of the orthonormal basis transformation coefficient of a high frequency becomes high as the cutoff frequency becomes high.

23. The image processing system according to claim 16, further comprising
a sample information acquisition unit configured to acquire optical characteristic information of the sample, wherein the cutoff frequency acquisition unit uses the optical characteristic information when acquiring the cutoff frequency.

24. A microscope system comprising the image processing system of claim 1,
wherein the optical system includes a variable magnification optical system.

* * * * *